US012732574B2

(12) United States Patent
Kang et al.

(10) Patent No.: US 12,732,574 B2
(45) Date of Patent: Sep. 8, 2026

(54) ELECTRONIC DEVICE AND METHOD FOR CHANGING DISPLAY AREA OF DISPLAY

(71) Applicant: SAMSUNG ELECTRONICS CO., LTD., Suwon-si (KR)

(72) Inventors: Hyunggwang Kang, Suwon-si (KR); Junhyuk Kim, Suwon-si (KR); Soohyun Seo, Suwon-si (KR); Wonho Lee, Suwon-si (KR); Hoyoung Jeong, Suwon-si (KR); Hyoungtak Cho, Suwon-si (KR); Hyunju Hong, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 204 days.

(21) Appl. No.: 18/754,179

(22) Filed: Jun. 26, 2024

(65) Prior Publication Data

US 2024/0348710 A1 Oct. 17, 2024

Related U.S. Application Data

(63) Continuation of application No. PCT/KR2022/020336, filed on Dec. 14, 2022.

(30) Foreign Application Priority Data

Feb. 14, 2022 (KR) ........................ 10-2022-0019208
Jun. 8, 2022 (KR) ........................ 10-2022-0069816

(51) Int. Cl.
*H04M 1/02* (2006.01)
*G06F 1/16* (2006.01)

(52) U.S. Cl.
CPC ........ *H04M 1/0268* (2013.01); *G06F 1/1624* (2013.01); *G06F 1/1652* (2013.01); *H04M 1/0237* (2013.01); *H04M 2250/12* (2013.01)

(58) Field of Classification Search
CPC ..... G09G 3/035; G06F 1/1624; G06F 1/1652; H04M 1/0237; H04M 1/0268; H04M 2250/12
See application file for complete search history.

(56) References Cited

U.S. PATENT DOCUMENTS 10,656,684 B2 5/2020 Wood et al.
10,747,269 B1 8/2020 Choi et al.
(Continued)

FOREIGN PATENT DOCUMENTS

CN 108965508 B 2/2020
EP 4254128 A1 10/2023
(Continued)

OTHER PUBLICATIONS

The extended European search report for EP Application No. 22926214.2 mailed on Feb. 10, 2025.
(Continued)

*Primary Examiner* — Patrick F Marinelli
(74) *Attorney, Agent, or Firm* — CANTOR COLBURN LLP

(57) ABSTRACT

According to various embodiments, an electronic device comprises: a first housing; a second housing slidably coupled to the first housing; a flexible display disposed on a surface formed by the first housing and the second housing; a motor for inserting the flexible display into the second housing, or retracting same from the second housing; an integrated circuit for controlling the voltage related to the motor; at least one sensor; and at least one processor. The at least one processor is configured to: identify data on the temperature related to the flexible display; identify the voltage to be applied to the motor through the integrated circuit; and change the display area of the flexible display.

20 Claims, 30 Drawing Sheets

(56) References Cited

U.S. PATENT DOCUMENTS

| | | | | |
|---|---|---|---|---|
| 11,062,683 | B2 * | 7/2021 | Park | G09G 5/38 |
| 11,106,245 | B2 | 8/2021 | Shim et al. | |
| 11,112,826 | B2 | 9/2021 | Ko et al. | |
| 11,206,322 | B2 | 12/2021 | Cha et al. | |
| 11,755,075 | B2 * | 9/2023 | Park | G06F 1/1686 361/679.01 |
| 11,990,070 | B2 * | 5/2024 | Kwak | G09G 3/035 |
| 12,204,381 | B2 * | 1/2025 | Kim | G06F 1/16 |
| 12,219,719 | B2 * | 2/2025 | Kim | H05K 5/0086 |
| 12,366,885 | B2 * | 7/2025 | Seo | G06F 1/1677 |
| 12,446,198 | B2 * | 10/2025 | Cho | H04M 1/0268 |
| 2016/0147262 | A1 * | 5/2016 | Lee | F03G 7/0614 345/173 |
| 2019/0042014 | A1 | 2/2019 | Ohata et al. | |
| 2019/0069451 | A1 | 2/2019 | Myers et al. | |
| 2020/0090628 | A1 * | 3/2020 | Park | G09G 5/38 |
| 2021/0158783 | A1 | 5/2021 | Lee et al. | |
| 2021/0195008 | A1 | 6/2021 | Lee | |
| 2022/0210253 | A1 | 6/2022 | Kwak et al. | |
| 2023/0040057 | A1 * | 2/2023 | Seo | G06F 1/1652 |
| 2023/0055031 | A1 * | 2/2023 | Kwak | G09G 3/035 |
| 2023/0093986 | A1 | 3/2023 | Eom et al. | |
| 2023/0122508 | A1 * | 4/2023 | Kim | G06F 1/1679 318/558 |
| 2023/0389243 | A1 * | 11/2023 | Cho | H05K 5/0217 |
| 2024/0348710 | A1 * | 10/2024 | Kang | G06F 3/041 |
| 2024/0427383 | A1 * | 12/2024 | Kim | H04M 1/0268 |
| 2025/0008006 | A1 * | 1/2025 | Kang | H02P 6/08 |
| 2025/0298425 | A1 * | 9/2025 | Kang | G05D 3/12 |
| 2025/0350217 | A1 * | 11/2025 | Feng | H02P 8/34 |

FOREIGN PATENT DOCUMENTS

| | | | |
|---|---|---|---|
| EP | 4376392 | A1 | 5/2024 |
| EP | 3979045 | B1 | 9/2024 |
| JP | H11306701 | A | 11/1999 |
| JP | 2019219449 | A | 12/2019 |
| JP | 2020046608 | A | 3/2020 |
| KR | 20070030006 | A | 3/2007 |
| KR | 20160123201 | A | 10/2016 |
| KR | 20200064573 | A | 6/2020 |
| KR | 20200144822 | A | 12/2020 |
| KR | 20210041380 | A | 4/2021 |
| KR | 102281347 | B1 | 7/2021 |
| KR | 102330164 | B1 | 11/2021 |
| KR | 20210146095 | A | 12/2021 |
| KR | 20210148396 | A | 12/2021 |
| KR | 20210151654 | A | 12/2021 |
| KR | 20220015775 | A | 2/2022 |
| WO | 2020111793 | A1 | 6/2020 |
| WO | 2020246814 | A1 | 12/2020 |
| WO | 2021100932 | A1 | 5/2021 |
| WO | 2022030792 | A1 | 2/2022 |

OTHER PUBLICATIONS

Indian Office Action for IN Application No. 202417053799 mailed on Feb. 27, 2026.

International Search Report and Written Opinion mailed Apr. 3, 2023 for PCT/KR2022/020336.

European Office Action for EP Application No. 22926214.2 mailed on Dec. 18, 2025.

European Office Action for EP Application No. 22926214.2 mailed on Jul. 31, 2025.

* cited by examiner

ELECTRONIC DEVICE AND METHOD FOR CHANGING DISPLAY AREA OF DISPLAY

CROSS-REFERENCE TO RELATED APPLICATIONS

This application is a continuation application of International Application No. PCT/KR2022/020336 designating the United States, filed on Dec. 14, 2022, in the Korean Intellectual Property Receiving Office and claiming priority to Korean Patent Application No. 10-2022-0019208, filed on Feb. 14, 2022, and Korean Patent Application No. 10-2022-0069816, filed on Jun. 8, 2022, in the Korean Intellectual Property Office, the disclosures of which are incorporated by reference herein in their entireties.

BACKGROUND

1. Technical Field

The following descriptions relate to an electronic device and a method for changing a display area of a display.

2. Background Art

As development of a flexible display progresses, development of an electronic device including a rollable shaped display through a flexible display is progressing. In the electronic device including the rollable display, as a part of a display is inserted into or extracted from a housing, a display area of the display may be changed. The display area of the rollable shaped display may be manually changed through a hinge or spring, or may be automatically changed through a motor.

SUMMARY

1. Technical Problem

In an electronic device including a rollable shaped display, a display may be rolled or unrolled through a motor. The electronic device may change a state of the display only when magnitude of the motor's thrust is greater than magnitude of driving force (or thrust) for rolling or unrolling the display. The magnitude of the driving force for changing the state (e.g., rolling or unrolling) of the display may be changed depending on temperature, the presence or absence of foreign material, and/or mechanical deformation of the display. When the magnitude of the thrust of the motor is smaller than the magnitude of the driving force for rolling or unrolling the display, step-out may occur in the motor.

The technical problems to be achieved in this document are not limited to those described above, and other technical problems not mentioned herein will be clearly understood by those having ordinary knowledge in the art to which the present disclosure belongs, from the following description.

2. Technical Solution

According to various embodiments, an electronic device may include a first housing; a second housing slidably coupled to the first housing; a flexible display disposed on a surface formed by the first housing and the second housing, which is insertable in the second housing or extractable from the second housing; a motor for inserting the flexible display in the second housing or extracting the flexible display from the second housing; a first integrated circuit for controlling voltage related to the motor; at least one sensor; and at least one processor operably coupled with the flexible display, the motor, the integrated circuit, and the at least one sensor. The at least one processor may be configured to identify, through the at least one sensor, data of temperature related to the flexible display. The at least one processor may be configured to determine, based on the identified data of the temperature, voltage to be applied to the motor through the first integrated circuit. The at least one processor may be configured to change a display area of the flexible display by controlling the first integrated circuit to apply the determined voltage to the motor.

According to various embodiments, an electronic device may include: a first housing, a second housing slidably coupled to the first housing, a flexible display disposed on a surface formed by the first housing and the second housing, which is insertable in the second housing or extractable from the second housing, a motor for inserting the flexible display in the second housing or extracting the flexible display from the second housing, an integrated circuit for controlling voltage related to the motor, at least one sensor, and at least one processor operably coupled with the flexible display, the motor, the integrated circuit, and the at least one sensor. The at least one processor may be configured to identify data of a display area of the flexible display through the at least one sensor. The at least one processor may be configured to determine voltage to be applied to the motor through the integrated circuit, based on the data of the display area of the flexible display. The at least one processor may be configured to change the display area of the flexible display by controlling the integrated circuit to apply the determined voltage to the motor.

According to various embodiments, an electronic device may include: a first housing; a second housing slidably coupled to the first housing; a flexible display disposed on a surface formed by the first housing and the second housing, which is insertable in the second housing or extractable from the second housing; a motor for inserting the flexible display in the second housing or extracting the flexible display from the second housing; an integrated circuit for controlling voltage related to the motor; at least one sensor; and at least one processor operably coupled with the flexible display, the motor, the integrated circuit, and the at least one sensor. The at least one processor may be configured to identify, through the at least one sensor, whether a size of a display area of the flexible display is maintained, increases or decreases, determine voltage to be applied to the motor based on whether the size of the display area of the flexible display is maintained, increases or decreases, and change the display area of the flexible display by controlling the integrated circuit to apply the determined voltage to the motor According to various embodiments, an electronic device may include a first housing, a second housing slidably coupled to the first housing, a flexible display disposed on a surface formed by the first housing and the second housing, which is insertable in the second housing or extractable from the second housing, a motor for inserting the flexible display in the second housing or extracting the flexible display from the second housing, an integrated circuit for controlling voltage related to the motor, at least one sensor, and at least one processor operably coupled with the flexible display, the motor, the integrated circuit, and the at least one sensor. The at least one processor may be configured to, in a state in which a step-out of the motor does not occur, change a display area of the flexible display by applying, based on a plurality of pulses, pre-designated voltage to the motor and identify a total number of pulses for changing a state of the flexible display from a first state to a second state as a first number. The at least one processor may be configured to apply, based on a pre-designated number of pulses, pre-designated voltage to the motor for changing the display area of the flexible display, after applying, based on the pre-designated number of pulses, the pre-designated voltage to the motor, identify whether the state of the flexible display is different from a pre-designated state of the flexible display reached after applying, based on the pre-designated number of pulses, the pre-designated voltage to the motor when a step-out of the motor does not occur, identify a step-out rate of the motor when the state of the flexible display is different from the pre-designated state, determine, based on the step-out rate of the motor and the pre-designated voltage, voltage to be applied to the motor, and change the display area of the flexible display by controlling the integrated circuit to apply the determined voltage to the motor.

3. Advantageous Effects

According to an embodiment, an electronic device can identify data of temperature related to a display. The electronic device can change voltage applied to a motor, based on data of the temperature related to the display. The electronic device can change the voltage applied to the motor, based on various data as well as the data of the temperature related to the display. The electronic device can reduce power consumption by changing flexibly the voltage applied to the motor.

The effects that can be obtained from the present disclosure are not limited to those described above, and any other effects not mentioned herein will be clearly understood by those having ordinary knowledge in the art to which the present disclosure belongs, from the following description.

DETAILED DESCRIPTION

Figure 1:
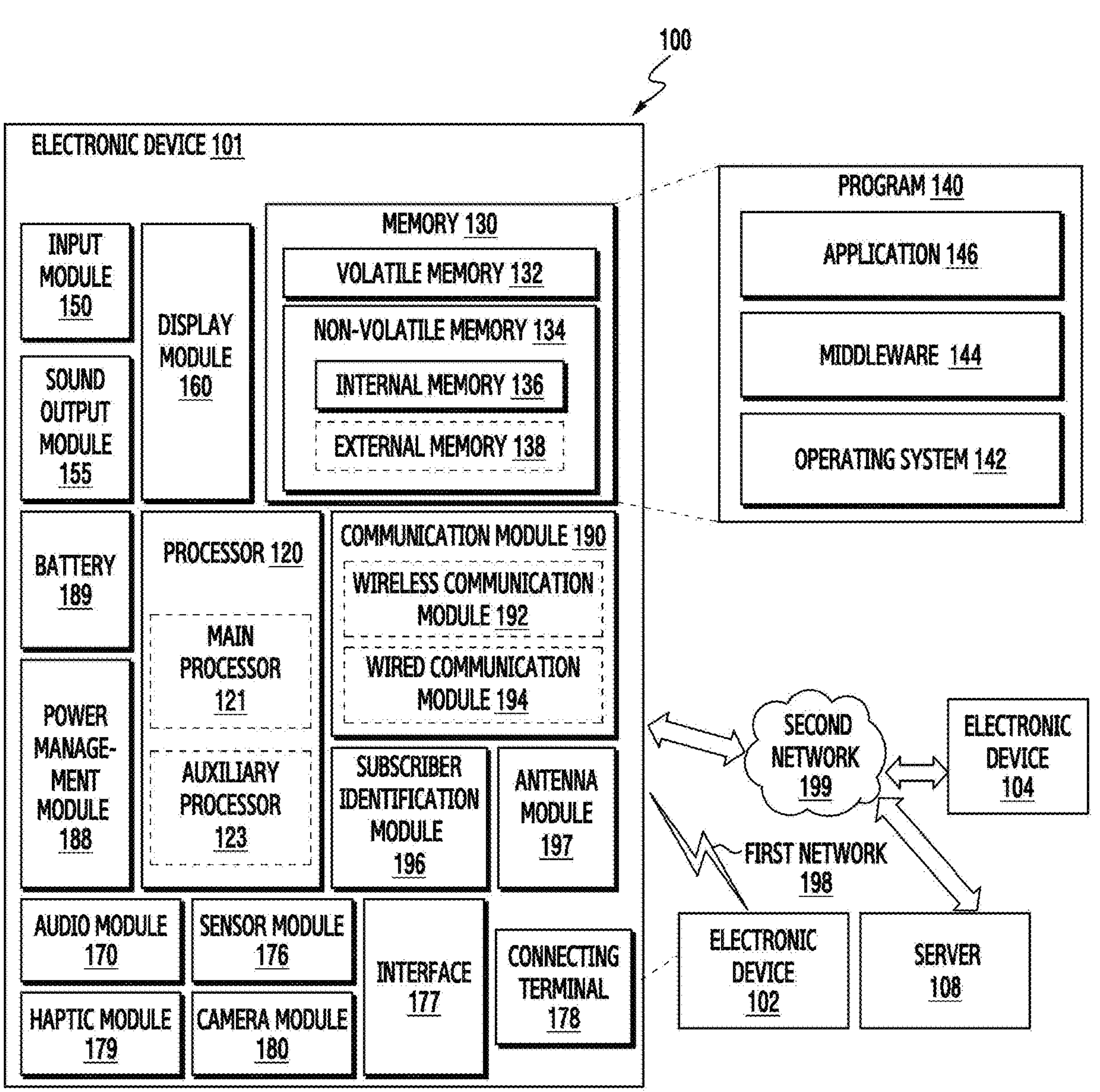
FIG. 1 is a block diagram of an electronic device in a network environment, according to various embodiments.

FIG. 1 is a block diagram of an electronic device in a network environment, according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), decp Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
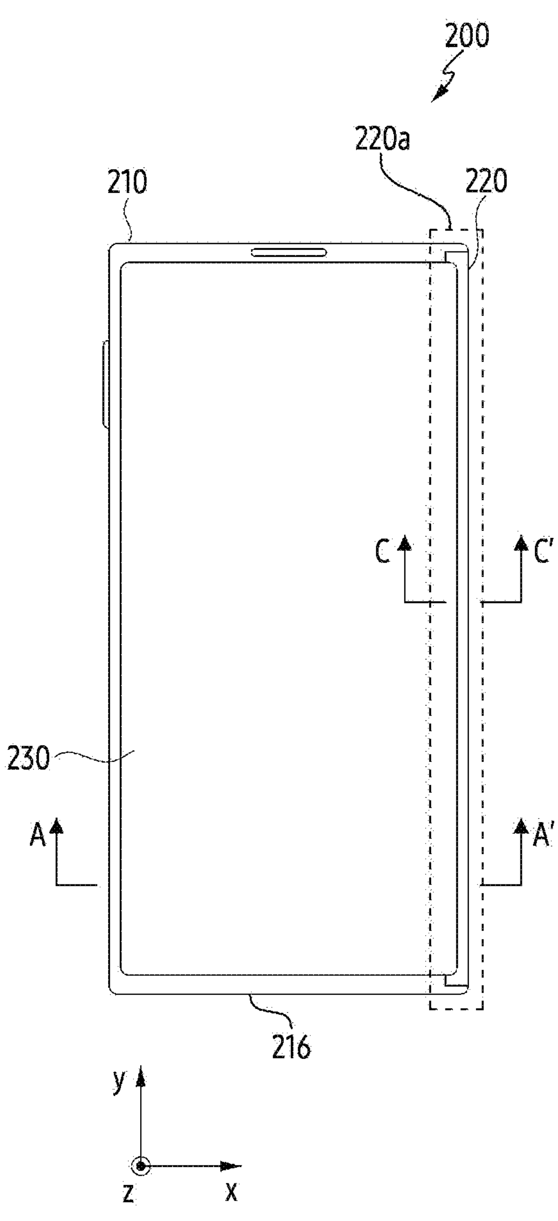
FIG. 2A is a front view of a first state of an electronic device, according to various embodiments.
Figure 2B:
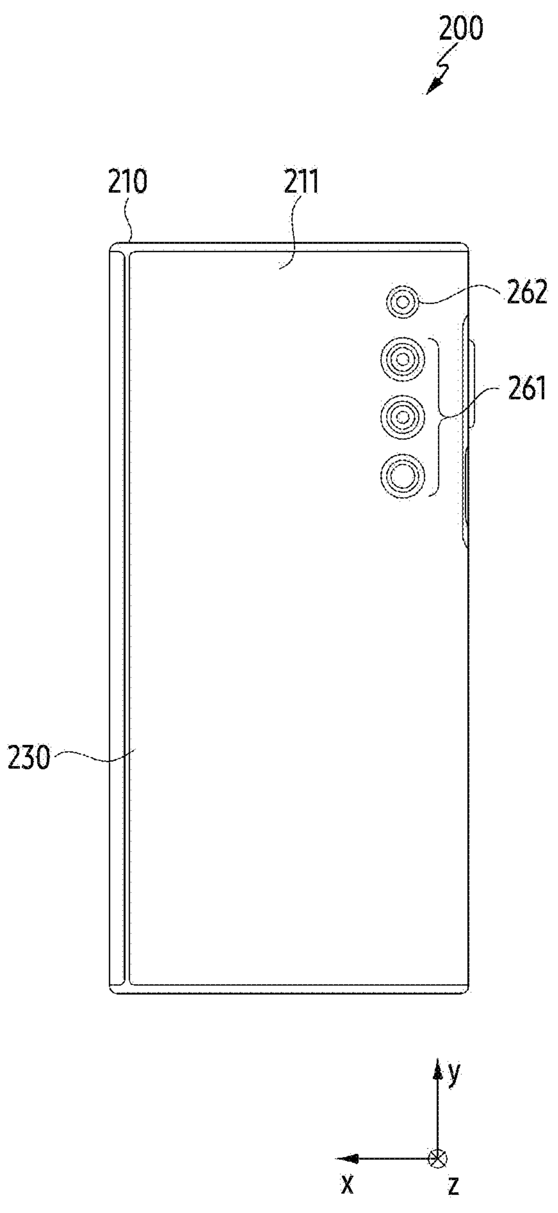
FIG. 2B is a rear view of a first state of an electronic device, according to various embodiments.
Figure 3A:
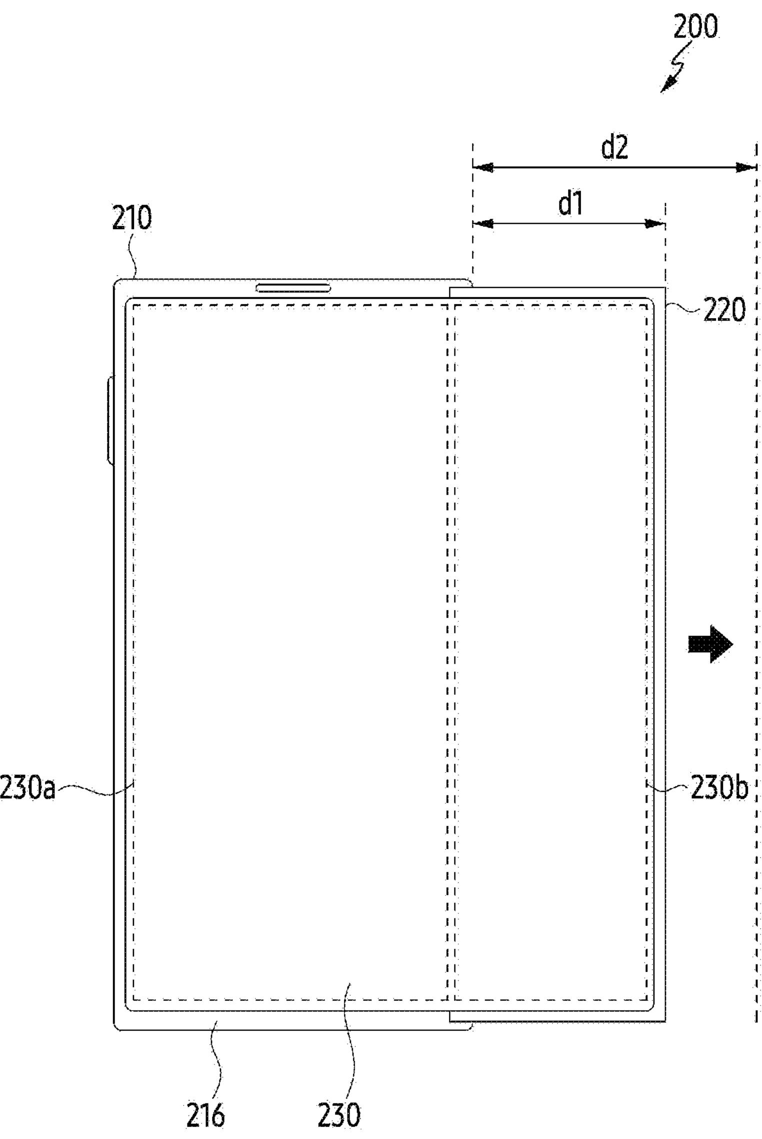
FIG. 3A is a front view of a second state of an electronic device, according to various embodiments.
Figure 3A:
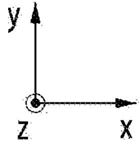
Figure 3B:
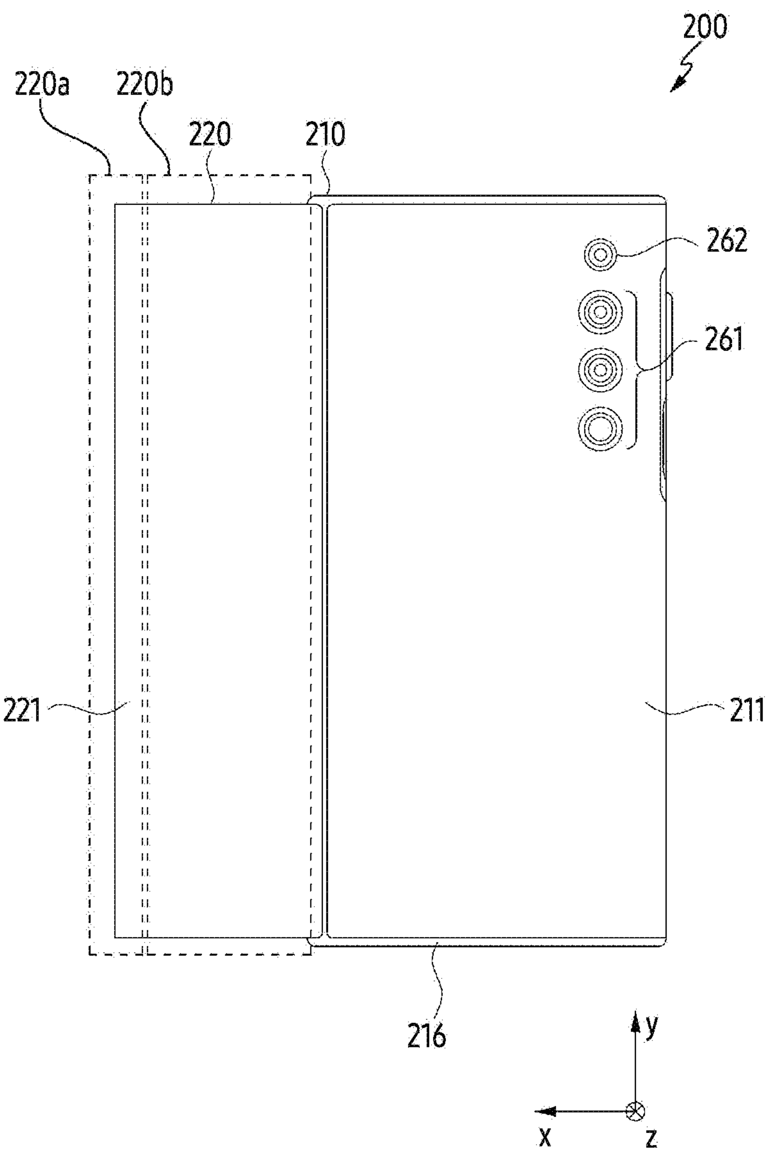
FIG. 3B is a rear view of a second state of an electronic device, according to various embodiments.

FIG. 2A is a front view of a first state of an electronic device, according to various embodiments. FIG. 2B is a rear view of a first state of an electronic device, according to various embodiments. FIG. 3A is a front view of a second state of an electronic device, according to various embodiments. FIG. 3B is a rear view of a second state of an electronic device, according to various embodiments.

Referring to FIGS. 2A, 2B, 3A, and 3B, according to an embodiment, an electronic device 200 (e.g., the electronic device 101 of FIG. 1) may include a first housing 210 and a second housing 220. According to an embodiment, the second housing 220 may move in a direction designated from the first housing 210, for example, in a first direction (+x direction). For example, the second housing 220 may slide from the first housing 210 by a designated distance in the first direction (+x direction). According to an embodiment, the second housing 220 may reciprocate within a distance designated from a part of the first housing 210 in the first direction (+x direction).

In an embodiment, a state in which the second housing 220 slides from the first housing 210 in the first direction (+x direction) may be defined as a second state (e.g., an extended state, or a slide-out state) of the electronic device 200. In various embodiments of the present document, the second state of the electronic device 200 may be defined as a state in which a second portion 230*b* of a display 230 is visually exposed from the outside. Alternatively, the second state of the electronic device 200 may mean a state in which the second portion 230*b* of the display 230 is located outside the second housing 220. According to an embodiment, the second housing 220 may move from the first housing 210 in the first direction (+x direction) so that at least a portion of the second housing 220 and/or the second portion 230*b* of the display 230 may be extracted, and an extraction length d1 may be formed corresponding to a moving distance. According to an embodiment, the second housing 220 may reciprocate within a designated distance d2. According to an embodiment, the extraction length d1 may have a size between 0 to a designated distance d2.

In various embodiments of the present document, a state in which the second housing 220 slides in a second direction (−x direction) opposite to the first direction (+x direction), which is the direction of the first housing 210 as an example, may be defined as a first state (e.g., a contraction state, or a slide-in state) of the electronic device 200. In an embodiment, the first state of the electronic device 200 may be defined as a state in which the second portion 230*b* of the display 230 is not visually exposed from the outside. Alternatively, the second state of the electronic device 200 may mean a state in which the second portion 230*b* of the display 230 is located inside the second housing 220.

In various embodiments, the first state may be referred to as a first shape, and the second state may be referred to as a second shape. For example, the first shape may include a normal state, a reduced state, or a closed state, and the second shape may include an opened state. Additionally, in an embodiment, the electronic device 400 may form a third state (e.g., an intermediate state) that is a state between the first state and the second state. For example, the third state may be referred to as a third shape, and the third shape may include a free stop state.

According to various embodiments of the present document, in inter-transition between the second state and/or the first state, the electronic device 200 may be manually switched by a user's operation or automatically switched through a driving module (not illustrated) disposed inside the first housing 210 or the second housing 220. According to an embodiment, the driving module may be triggered based on a user input. According to an embodiment, a user input for triggering an operation of the driving module may include a touch input, a force touch input, and/or a gesture input through the display 230. In another embodiment, the user input for triggering the operation of the driving module may include an audio input (voice input), or an input of a physical button exposed to the outside of the first housing 210 or the second housing 220. According to an embodiment, the driving module may be driven in a semi-automatic scheme in which an operation is triggered when a manual operation by the user's external force is detected.

According to an embodiment, the electronic device 200 may be referred to as a "slidable electronic device" as the second housing 220 is designed to slide, or referred to as a "rollable electronic device" as at least a portion of the display 230 is designed to be wound inside the second housing 220 (or the first housing 210) based on the slide movement of the second housing 220.

According to an embodiment, in the electronic device 200, the second housing 220 may be coupled to be at least partially slidable from the first housing 210. According to an embodiment, a coupling form of the first housing 210 and the second housing 220 is not limited to the shape and coupling illustrated in FIGS. 2A, 2B, 3A, and 3B, and may be implemented by a combination and/or coupling of other shapes or components.

According to an embodiment, the first housing 210 of the electronic device 200 may include a book cover 216 surrounding an inner space of the first housing 210 and a rear plate 211 surrounding a rear surface of the book cover 216. The second housing 220 of the electronic device 200 may include a slide cover 221 surrounding an inner space of the second housing 220.

According to an embodiment, the slide cover 221 may include a first cover area 220*a* of the slide cover 221 that is not inserted into the first housing 210 and is always visually exposed from the outside in the second state and the first state of the electronic device 200, and a second cover area 220*b* inserted in or extracted from the inner space of the first housing 210. According to an embodiment, the second cover area 220*b* of the second housing 220 may not be visually exposed from the outside in the first state, but may be visually exposed from the outside in the second state.

According to an embodiment, the display 230 may be disposed to be visually exposed from the outside through a front direction (e.g., the +z direction) of each of the first housing 210 and the second housing 220. According to an embodiment, a display area of the display 230 may include a first portion 230*a* and a second portion 230*b*.

According to an embodiment, the first portion 230*a* of the display 230 may be a display area that is fixedly visually exposed from the outside regardless of whether the electronic device 200 is in the second state or the first state. For example, the first portion 230*a* of the display 230 may be fixed without movement, regardless of the slide movement of the second housing 220.

According to an embodiment, the second portion 230*b* of the display 230 may be a display area extending from an end of the first portion 230*a*, and may be inserted into the inner space of the second housing 220 or extracted from the inner space of the second housing 220, in conjunction with the slide movement of the second housing 220. According to an embodiment, a hole (not illustrated) through which the second portion 230*b* of the display 230 is extracted or inserted may be disposed adjacent to a side surface of the second housing 220 in the +x direction. For example, the second portion 230*b* of the display 230 may be extracted or inserted from a +x-direction boundary portion of the second housing 220.

According to an embodiment, in the second state, the second portion 230*b* of the display 230 may be visually exposed from the outside by being extracted from the inner space of the second housing 220. According to an embodiment, in the first state, the second portion 230*b* of the display 230 may not be visually exposed from the outside, by being inserted into the inner space of the second housing 220.

According to an embodiment, the display 230 may include a flexible display. The second portion 230*b* of the display 230 may be inserted in a bent state while being rolled into the inner space of the second housing 220, in the first state.

According to an embodiment, in the first state, among the display area of the display 230, only the first portion 230*a* of the display 230 may be visually exposed from the outside. In the second state, among the display area of the display 230, the first portion 230*a* and the second portion 230*b* of the display 230 may be visually exposed from the outside.

According to embodiments, the electronic device 200 may include a camera module 261 and/or a flash 262. The camera module 261 and/or the flash 262 may be exposed through an opening formed in the rear plate 211. The camera module 261 may include a plurality of cameras. For example, the camera module 261 may include a wide-angle camera, an ultra-wide-angle camera, a telephoto camera, a proximity camera, and/or a depth camera. However, the camera module 261 is not necessarily limited to including the plurality of cameras, and may include a single camera. According to an embodiment, the camera module 261 may include one or more lenses, an image sensor, and/or an image signal processor. According to an embodiment, the flash 262 may include, for example, a light emitting diode or a xenon lamp.

According to an embodiment, the electronic device 200 may include a sensor module (not illustrated) and/or a camera module (not illustrated) disposed below the display 230 (e.g., in −z direction from the display 230). The sensor module may detect an external environment based on information (e.g., light) received by penetrating the display 230. According to an embodiment, the sensor module may include at least one of a receiver, a proximity sensor, an ultrasonic sensor, a gesture sensor, a gyro sensor, a barometric pressure sensor, a magnetic sensor, an acceleration sensor, a grip sensor, a color sensor, an infrared sensor, a biometric sensor, a temperature sensor, a humidity sensor, a motor encoder, or an indicator. According to an embodiment, at least some sensor module of the electronic device 200 may be visually exposed from the outside through a partial area of the display 230. According to an embodiment, the electronic device 200 may detect an extraction length (e.g., length A) by using the sensor module. According to an embodiment, the electronic device 200 may generate extraction information related to a degree of extraction detected by a sensor. For example, the electronic device 200 may detect and/or check a degree to which the second housing 220 is extracted using the extraction information. According to an embodiment, the extraction information may include information on an extraction length of the second housing 220.

According to an embodiment, the electronic device 200 may include a housing (e.g., the first housing 210 and the second housing 220) and a display 230 supported by the housings 210 and 220 of which a display area is adjusted in conjunction with at least a portion of the housings 210 and 220 moving in the first direction. The display area of the display 230 may include a first portion 230*a* that is fixedly exposed to the outside regardless of whether at least a portion of the second housing 220 moves in the first direction, and a second portion 230*b* extending from an end of the first portion 230*a* and exposed to the outside by being extracted from an inner space of the first housing 210 in conjunction with at least a portion of the second housing 220 moving in the first direction (+x direction).

Figure 4:
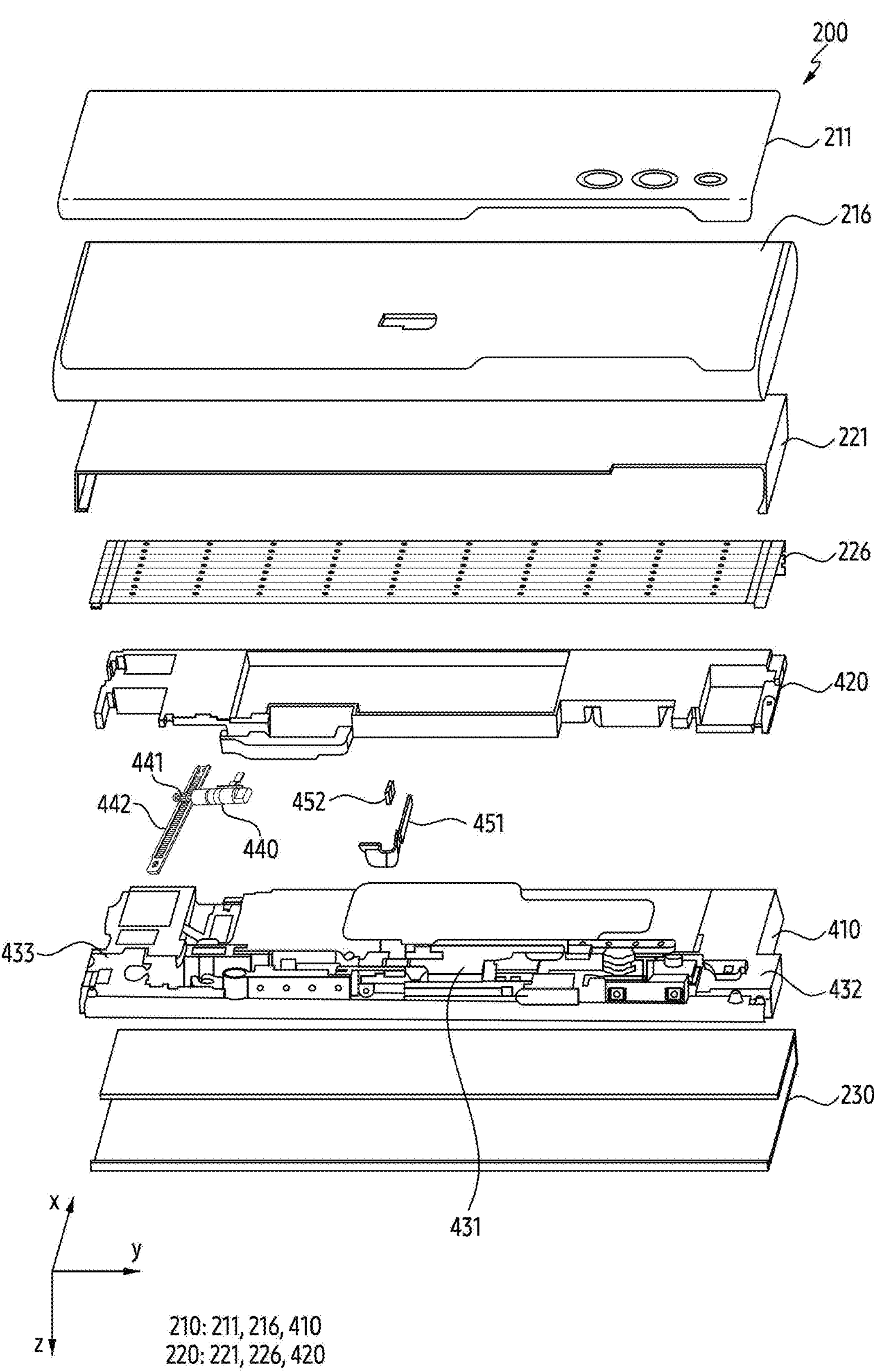
FIG. 4 is an exploded view of an electronic device, according to various embodiments.

FIG. 4 is an exploded view of an electronic device, according to various embodiments.

Referring to FIG. 4, an electronic device 200 may include a first housing 210, a second housing 220, and a display 230.

In an embodiment, the first housing 210 may include a rear plate 211, a book cover 216, and/or a first support member 410. The book cover 216 may form a portion of the exterior of the electronic device 200, and the rear plate 211 may form a portion of a rear surface of the electronic device 200. The rear plate 211 may be disposed in a direction (e.g., −z direction) facing a surface of the book cover 216. The book cover 216 may form a side surface of the electronic device 200 and may provide a surface on which the rear plate 211 is to be mounted.

According to an embodiment, the first support member 410 may extend inward from the book cover 216. The first support member 410 may be disposed between the display 230 and the book cover 216. For example, the book cover 216 may surround a space between the rear plate 211 and a first portion 230*a* of the display 230. The first support member 410 may extend from the book cover 216 within the space.

According to an embodiment, the first support member 410 may support or accommodate other components included in the electronic device 200. For example, the first portion 230*a* of the display 230 may be disposed on a surface of the first support member 410 facing a direction (e.g., the +z direction), and the first portion 230*a* of the display 230 may be supported by the first support member 410. For another example, PCBs 431, 432, 433, a driving unit assembly 440, a camera module 261, and a flash 262 may be disposed on another surface facing another direction (e.g., −z direction) opposite the direction of the first support member 410. The PCBs 431, 432, and 433, the driving unit assembly 440, the camera module 261, and the flash 262 may be respectively seated in a recess defined by the first support member 410 or a hole defined by the rear plate 211.

According to an embodiment, the PCBs 431, 432, and 433 and the driving unit assembly 440 may each be coupled to the first support member 410. For example, the PCBs 431, 432, and 433 may be fixed to the first support member 410 through a coupling member such as a screw. A rack gear 442 may be fixed to the first support member 410 through a coupling member. However, a fixing method or a fastening method is not limited to the above-described method.

According to an embodiment, a book cover 416 may be disposed between the first support member 410 and a rear plate 411. According to an embodiment, the book cover 416 may be disposed on the first support member 410. For example, the book cover 416 may be disposed on a surface of the first support member 410 facing the −z direction.

According to an embodiment, the book cover 416 may at least partially overlap the PCBs 431, 432, and 433 when viewed in the z-axis direction. The book cover 416 may cover at least some areas of the PCBs 431, 432, and 433. The book cover 416 may protect the PCBs 431, 432, and 433 from physical impact. The book cover 416 may be coupled to the first support member 410 through a coupling member (e.g., a screw).

According to an embodiment, the second housing 220 may include a slide cover 221, a support bar 226, and/or a second support member 420. The slide cover 221 may form another portion of the exterior of the electronic device 200. For example, the book cover 216 may form a portion of the exterior of the electronic device 200, and the slide cover 221 may form another portion of the exterior of the electronic device 200. According to an embodiment, the second housing 220 may be slidably coupled to the first housing 210. For example, in a first state, a second cover area 220*b* of the second housing 220 may be within the first housing 210. In a second state, a first cover area 210*b* of the second housing 220 may move along a first direction (+x direction) and be exposed to the outside of the first housing 210.

According to an embodiment, the support bar 226 may support a second portion 230*b* of the display 230 when the display 230 is extended to the second state. For example, the support bar 226 may be formed by combining a plurality of bars, in a shape corresponding to a shape of the second portion 230*b* of the display 230. According to an embodiment, in the first state in which the second portion 230*b* of the display 230 is wound in the second housing 220, the support bar 226 may be wound in the second housing 220 together with the second portion 230*b* of the display 230. The support bar 226 may move along a guide rail formed on an inner surface of the slide cover 221. As the support bar 226 moves into the slide cover 221, the second portion 230*b* of the display 230 may be wound into the slide cover 221.

According to an embodiment, the second portion 230*b* of the display 230 may be extracted from an inner space of the second housing 220 to the outside in the second state. For example, as the support bar 226 moves from an inner space of the slide cover 221 to the outside along the guide rail formed on the inner surface of the slide cover 221, the second portion 230*b* of the display 230 may be extracted from the inner space of the slide cover 221 to the outside.

According to an embodiment, the second support member 420 may extend inward from the slide cover 221. The second support member 420 may move in the first direction (+x direction) when the display 230 is expanded. For example, in the first state, the second support member 420 may be disposed below the first portion 230*a* of the display 230 or the first support member 410 (e.g., in the −z direction based on the display 230). In the second state, the second support member 420 may be disposed below the second portion 230*b* of the display 230 by moving in the first direction (+x direction). The second support member 420 may surround a space between the slide cover 221 and the display 230. The second support member 420 may extend from the slide cover 221 in the space.

According to an embodiment, the second support member 420 may support or accommodate other components included in the electronic device 200. The second support member 420 may support the support bar 226. The support bar 226 may be supported by the second support member 420 while moving along the inner surface of the slide cover 221 to maintain a shape of the second portion 230*b* of the display 230. The second support member 420 may be coupled to a driving unit of the driving unit assembly 440 or a case 470 surrounding the driving unit. For example, the case 470 or the driving unit may be fixed to the second support member 420 through a coupling member such as a screw. However, a fixing method or a fastening method is not limited to the above-described method.

According to an embodiment, the driving unit or the case 470 of the driving unit assembly 440 may be fixed to the second support member 420, and the rack gear 442 may be fixed to the second support member 420. When a pinion gear 441 rotates by driving of the driving unit assembly 440, the rack gear 442 engaged with the pinion gear 441 may move in a first direction (+x direction) or a second direction (−x direction).

According to an embodiment, in the first state, when the pinion gear 441 rotates counterclockwise by an operation of the driving unit assembly 440, the rack gear 442 may extend from the driving unit assembly 440 or the case 470 in the second direction (−x direction). By extending the rack gear 442 in the second direction, the driving unit assembly 440 or the case 470 may move in the first direction (+x direction). The second housing 220 coupled to the driving unit assembly 440 or the case 470 may move in the first direction (+x direction), by the movement of the driving unit assembly 440.

In the second state, when the pinion gear 441 rotates clockwise by the operation of the driving unit assembly 440, the rack gear 442 may move in the first direction (+x direction). When the rack gear 442 is inserted into the second housing 220 by moving in the first direction (+x direction), the driving unit assembly 440 or the case 470 may move in the second direction (−x direction). The second housing 220 coupled to the driving unit assembly 440 or the case 470 may move in the second direction (−x direction), by the movement of the driving unit assembly 440.

It has been described that the rack gear 442 is fixed to the first support member 410, and the driving unit assembly 440 is fixed to the second support member 420, but is not limited thereto. The rack gear 442 may be fixed to the second support member 420, and the driving unit assembly 440 or the case 470 may be fixed to the first support member 410. For example, as the rack gear 442 moves due to the operation of the driving unit, the second support member 420 coupled to the rack gear 442 may move.

According to an embodiment, the electronic device 200 may further include a flexible printed circuit board (FPCB) 451 including a hall sensor and a magnetic material 452. The magnetic material 452 may be disposed in the second support member 420, and the FPCB 451 may be disposed in the first support member 410. The hall sensor disposed in the FPCB 451 may detect magnitude and direction of magnetic force supplied from the magnetic material 452, according to the movement of the second support member 420. Based on the magnitude and direction of the magnetic force detected using the hall sensor disposed in the FPCB 451, the processor (e.g., the processor 120 of FIG. 1) may detect a moving distance and/or a moving direction of the second support member 420. Although the FPCB 451 has been described as having a hall sensor, the FPCB 451 may include a plurality of hall sensors. Based on data obtained through each of the plurality of hall sensors, the processor 120 may more accurately detect a location, a moving distance, and/or a moving direction of the second support member 420 than a case of using a hall sensor.

Figure 5A:
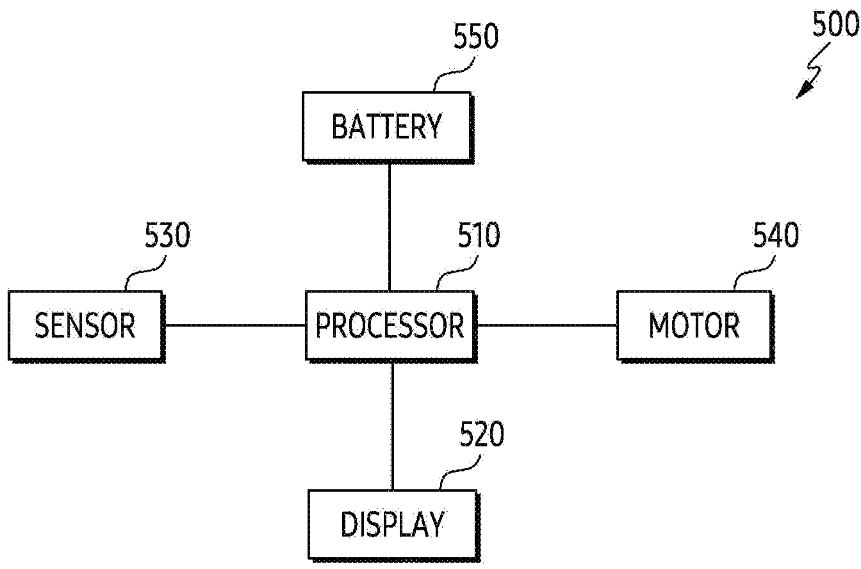
FIG. 5A is a simplified block diagram of an electronic device, according to various embodiments.

FIG. 5A is a simplified block diagram of an electronic device, according to various embodiments.

Referring to FIG. 5A, an electronic device 500 may include some or all of the components of the electronic device 101 illustrated in FIG. 1. For example, the electronic device 500 may correspond to the electronic device 101 illustrated in FIG. 1. For example, the electronic device 500 may correspond to the electronic device 200 illustrated in FIGS. 2A to 4.

According to an embodiment, the electronic device 500 may include a processor 510, a display 520, a sensor 530, a motor 540, and/or a battery 550. According to an embodiment, the electronic device 500 may include at least one of the processor 510, the display 520, the sensor 530, the motor 540, and the battery 550. For example, at least some of the processor 510, the display 520, the sensor 530, the motor 540, and the battery 550 may be omitted according to an embodiment.

According to an embodiment, the processor 510 may be operably (or operatively) coupled with or connected with the display 520, the sensor 530, the motor 540, and the battery 550. For example, the processor 510 may control the display 520, the sensor 530, the motor 540, and the battery 550. The display 520, the sensor 530, the motor 540, and the battery 550 may be controlled by the processor 510. For example, the processor 510 may be configured with at least one processor. The processor 510 may include at least one processor. For example, the processor 510 may correspond to the processor 120 of FIG. 1.

According to an embodiment, the processor 510 may include a hardware component for processing data based on one or more instructions. For example, the hardware component for processing data may include an Arithmetic and Logic Unit (ALU), a Field Programmable Gate Array (FPGA), and/or a Central Processing Unit (CPU).

According to an embodiment, the processor 510 may include the display 520. For example, the display 520 may be a rollable display or a flexible display. For example, the display 520 may be configured such that at least a portion of the display 520 is capable of being inserted into a housing (or second housing) of the electronic device 500 or capable of being extracted from the housing of the electronic device 500. For example, the display 520 may correspond to the display module 160 of FIG. 1. For example, the display 520 may correspond to the display 230 of FIGS. 2A to 4.

According to an embodiment, since the display 520 is deformable, the display 520 may have a plurality of states.

For example, in a first state of the display 520, a display area of the display 520 may be set to be the smallest. As an example, the first state may be a state in which a visible area having a minimum size is provided. As an example, the first state may be a state in which the display 520 provides a display area exposed to a minimum size. The first state may be referred to as a reduced state of the display 520.

For example, in a second state of the display 520, the display area of the display 520 may be set to be the largest. As an example, the second state may be a state in which a visible area having a maximum size is provided. As an example, the second state may be a state in which the display 520 provides a display area exposed to the maximum size. The second state may be referred to as an extended state of the display 520.

For example, the display 520 may provide an intermediate state (e.g., a third state) between the first state and the second state.

According to an embodiment, the electronic device 500 may include the sensor 530. The sensor 530 may be used to obtain various information. For example, the sensor 530 may be used to obtain information on a state of the electronic device 500. For example, the sensor 530 may obtain information on a state in which a second housing is moved, among a first housing (e.g., the first housing 210 of FIG. 2A) and the second housing (e.g., the second housing 220 of FIG. 2A) included in the electronic device 500. For example, the sensor 530 may be used to identify a temperature of the display 520. For example, the sensor 530 may be configured with at least one sensor. The sensor 530 may include at least one sensor. For example, the sensor 530 may correspond to the sensor module 176 of FIG. 1.

For example, the sensor 530 may include at least one of a temperature sensor, a sliding sensor, an impact detection sensor, and a drop detection sensor. A specific example of the sensor 530 including the temperature sensor, the sliding sensor, the impact detection sensor, and the drop detection sensor will be described later in FIG. 5B.

According to an embodiment, the electronic device 500 may include the motor 540. For example, the motor 540 (e.g., the driving unit assembly 440 of FIG. 4) may operate to move or slide the second housing of the electronic device 500 with respect to the first housing. For example, a shaft of the motor 540 may be coupled to a pinion gear (e.g., the pinion gear 441 of FIG. 4). The processor 510 may move a rack gear (e.g., the rack gear 442 of FIG. 4) coupled to the first housing based on rotating the pinion gear using the motor 540. The processor 510 may change a display area of the display 520 by moving the rack gear. For example, the processor 510 may change a velocity in which the display area of the display 520 is changed by changing a rotation velocity of the motor 540. For example, the processor 510 may change thrust of the motor 540 by changing voltage and/or current applied to the motor 540.

According to an embodiment, the electronic device 500 may include the battery 550. The battery 550 may store power for applying power to the motor 540. The battery 550 may provide power for applying a designated voltage to a motor through an integrated circuit. The battery 550 may include a rechargeable battery. For example, the battery 550 may correspond to the battery 189 of FIG. 1.

According to an embodiment, the electronic device 500 may operate in a normal mode and a low power mode. For example, in the low power mode, the processor 510 may set voltage provided from the battery 550 to be less than or equal to a pre-designated voltage value. For example, the processor 510 may change an operation mode of the electronic device 500 from the normal mode to the low power mode, based on identifying that the remaining amount of the battery 550 is less than or equal to the pre-designated remaining amount value.

Although not illustrated, the electronic device 500 may include internally at least one integrated circuit for controlling the motor 540. The electronic device 500 may include a first integrated circuit and/or a second integrated circuit. The first integrated circuit and/or the second integrated circuit may be used to control the motor 540. The processor 510 may control the motor 540 through the first integrated circuit and/or the second integrated circuit. An embodiment for the processor 510 to control the motor 540 through the first integrated circuit and/or the second integrated circuit may be described with reference to FIG. 5C.

Figure 5B:
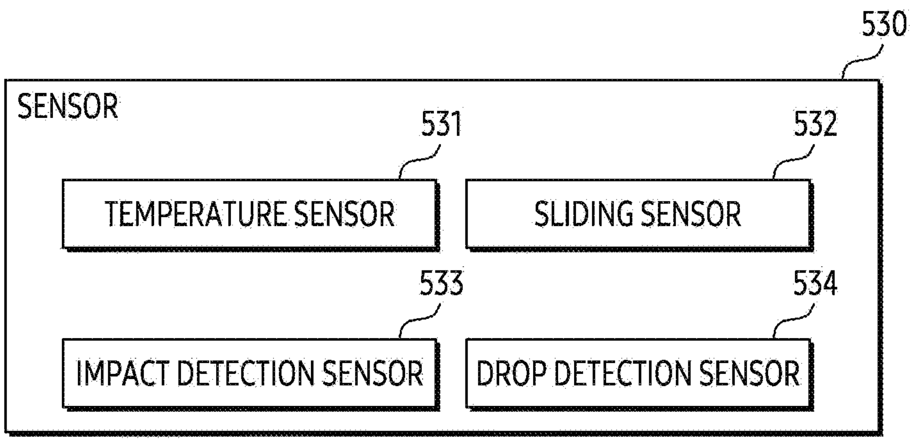
FIG. 5B is a specific example of a sensor of an electronic device, according to various embodiments.

FIG. 5B is a specific example of a sensor of an electronic device, according to various embodiments.

Referring to FIG. 5B, the sensor 530 may include the temperature sensor 531, the sliding sensor 532, the impact detection sensor 533, and/or the drop detection sensor 534.

According to an embodiment, the temperature sensor 531 may be used to identify an internal temperature of the electronic device 500. For example, the temperature sensor 531 may be used to identify a temperature (or data on the temperature) related to the display 520. The temperature sensor 531 may be used to identify the temperature of the display 520. The temperature sensor 531 may be disposed close to the display 520 to identify the temperature of the display 520. The temperature sensor 531 may be disposed toward the display 520 to identify the temperature of the display 520. For example, the temperature sensor 531 may be disposed in a first housing (e.g., the first housing 210 of FIG. 2A). An example of the temperature sensor 531 disposed in the first housing may be described with reference to FIGS. 9A and 9B.

According to an embodiment, the sliding sensor 532 may be used to obtain information on a state in which a second housing is moved, among a first housing (e.g., the first housing 210 of FIG. 2A) and the second housing (e.g., the second housing 220 of FIG. 2A) included in the electronic device 500. For example, since a display area of the display 520 may be changed according to a state in which the second housing is moved, the sliding sensor 532 may be used to identify data on the display area of the display. For example, the sliding sensor 532 may include a plurality of hall sensors. The sliding sensor 532 may identify data on the display area of the display 520, based on data related to magnetic power identified through the plurality of hall sensors. A specific example of identifying data on the display area of the display 520 through the plurality of hall sensors may be described with reference to FIGS. 13A and 13B.

According to an embodiment, the impact detection sensor 533 may be used to identify that an impact has occurred in the electronic device 500. For example, the impact detection sensor 533 may be used to detect vibration or impact applied on the electronic device 500. According to an embodiment, the drop detection sensor 534 may be used to identify whether the electronic device 500 has been dropped. For example, the drop detection sensor 534 may be used to determine whether the electronic device 500 is falling by using information obtained through at least one of a gyro sensor and an acceleration sensor. According to an embodiment, the processor 510 may identify whether an impact has occurred due to the drop of the electronic device 500 through the impact detection sensor 533 and/or the drop detection sensor 534.

Although not illustrated, the sensor 530 may further include a sensor for identifying (or measuring) thrust of the motor 540. The sensor 530 may identify (or determine) whether the thrust of the motor 540 for changing the display area of the display 520 is appropriate by measuring the thrust generated through the motor 540.

Figure 5C:
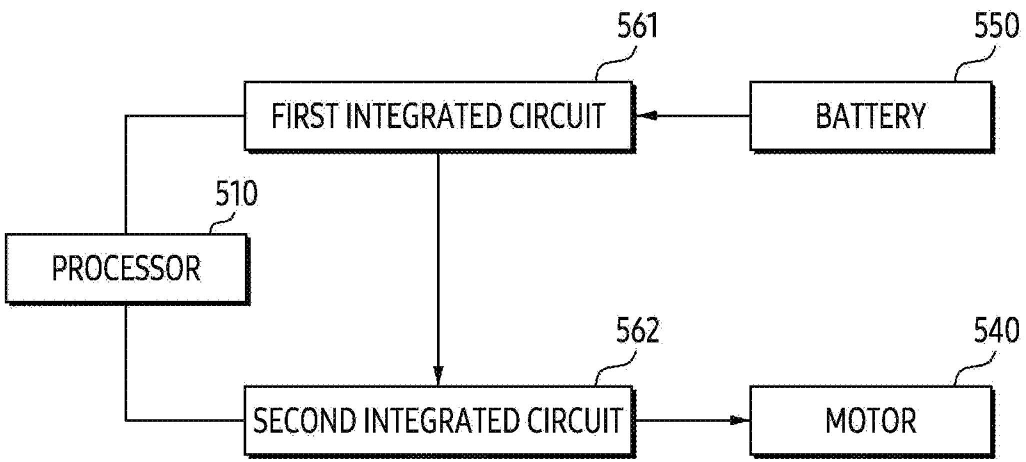
FIG. 5C illustrates an example of a process of applying voltage to a motor, according to various embodiments.

FIG. 5C illustrates an example of a process of applying voltage to a motor, according to various embodiments.

Referring to FIG. 5C, the electronic device 500 may include a first integrated circuit 561 and a second integrated circuit 562 for applying voltage to the motor 540. The processor 510 may control the first integrated circuit 561 and the second integrated circuit 562. For example, the first integrated circuit 561 may be used to change voltage applied to the second integrated circuit 562. The second integrated circuit 562 may be used to apply voltage to the motor 540.

For example, the first integrated circuit 561 may be used to boost (or step-down) the voltage applied from the battery 550. The processor 510 may boost (or step down) the voltage applied from the battery 550, through the first integrated circuit 561, in order for the motor 540 to apply a voltage for generating optimal thrust to the second integrated circuit 562. As an example, the first integrated circuit 561 may be referred to as a Boost IC.

For example, the second integrated circuit 562 may apply voltage to the motor 540, based on the voltage applied from the first integrated circuit 561. When the motor 540 is a 2 step motor, the second integrated circuit 562 may apply a signal (or voltage) of one of A-phase and B-phase to the motor 540. The magnitude of the voltage in the A-phase and the B-phase may be identified based on the magnitude of the voltage applied from the first integrated circuit 561 to the second integrated circuit 562. As an example, the magnitude of the voltage in the A-phase and the B-phase may be set to be the same as the magnitude of the voltage applied from the integrated circuit 561 to the second integrated circuit 562. As an example, the second integrated circuit 562 may be referred to as a Motor Driver IC.

According to an embodiment, the processor 510 may change voltage applied from the battery 550 to the first integrated circuit 561. For example, the processor 510 may change the magnitude of the voltage applied from the battery 550 to the first integrated circuit 561, in the low power mode.

According to an embodiment, the processor 510 may use the first integrated circuit 561 and the second integrated circuit 562 to change the voltage applied to the motor 540. For example, the processor 510 may change the voltage (or the magnitude of the voltage) applied to the motor 540, by changing the voltage applied to the second integrated circuit 562 from the first integrated circuit 561. The processor 510 may change thrust (or output) of the motor 540 by changing the voltage applied to the motor 540. The processor 510 may change torque of the motor 540 by changing the voltage applied to the motor 540.

Figure 6A:
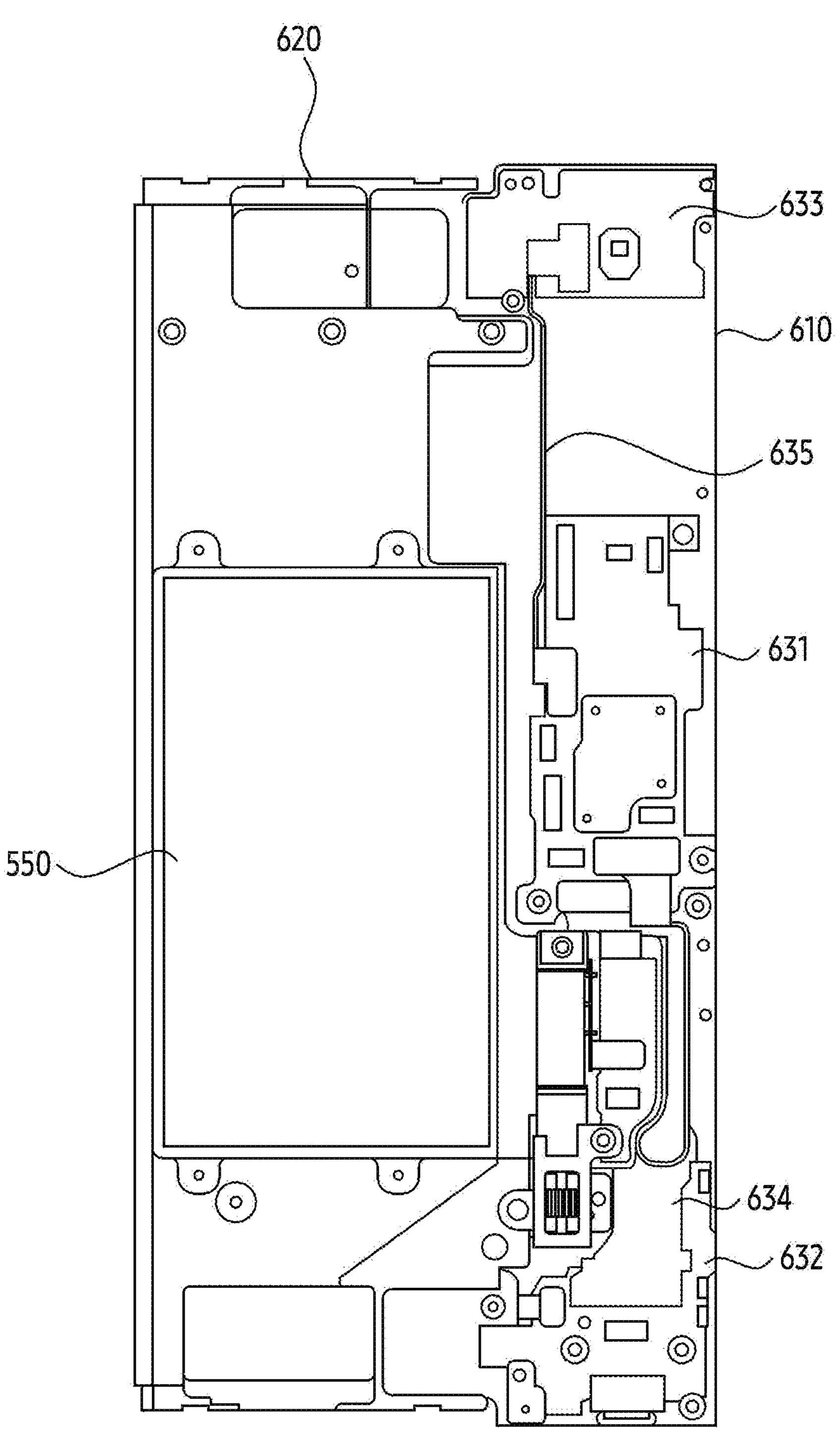
FIGS. 6A and 6B are an example of an internal structure of an electronic device 500, according to various embodiments.
Figure 6B:
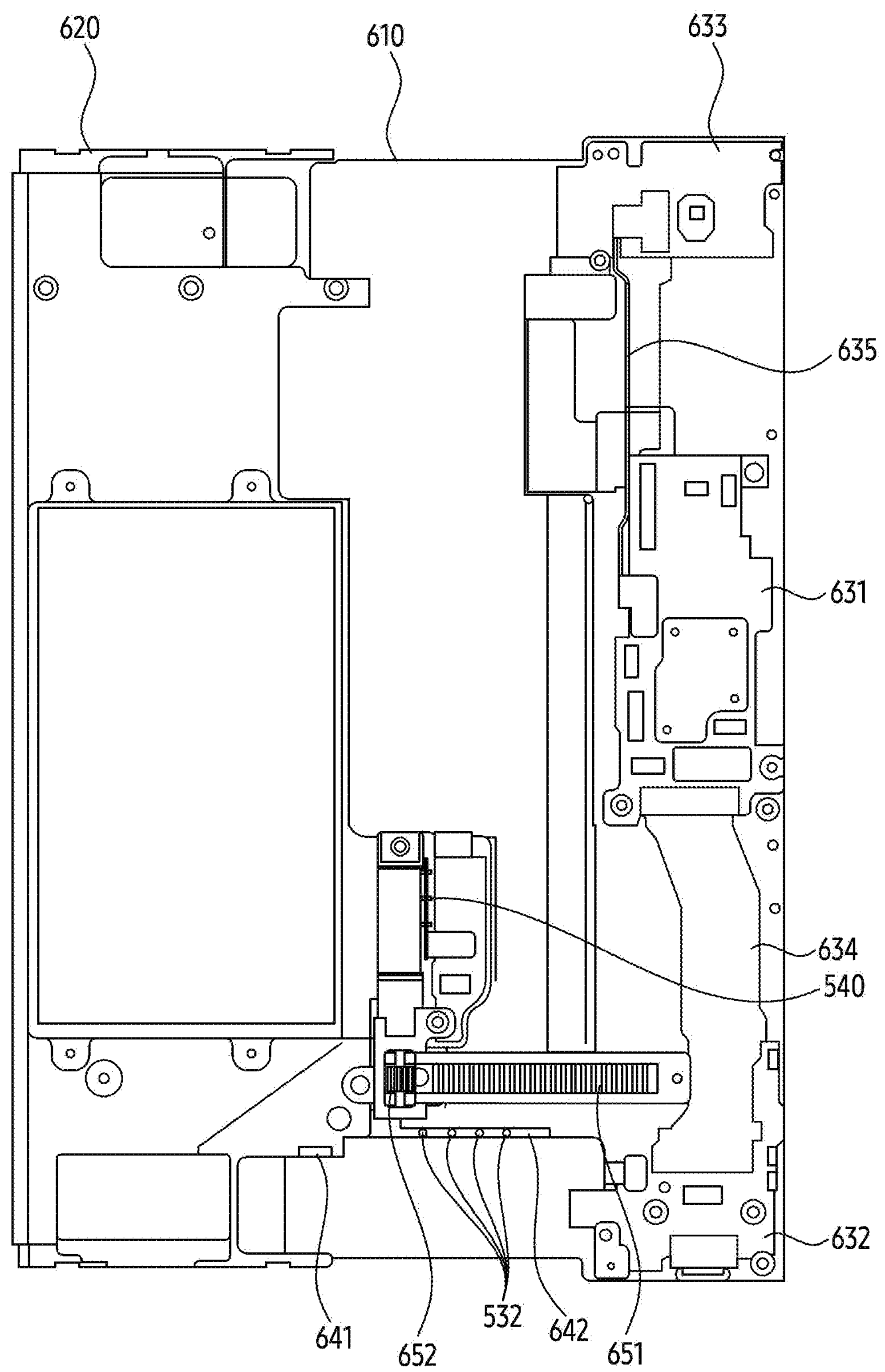

FIGS. 6A and 6B are an example of an internal structure of an electronic device 500, according to various embodiments.

Referring to FIGS. 6A and 6B, FIG. 6A is an internal structure diagram of the electronic device 500 in a first state in which a display area of a display 520 is minimized. FIG. 6B is an internal structure diagram of the electronic device 500 in a second state in which the display area of the display 520 is maximized. For example, a first support member 610 may be included in a first housing (e.g., the first housing 210 of FIG. 2A). For example, a second support member 620 may be included in a second housing (e.g., the second housing 220 of FIG. 2A). For example, the first support member 610 and the second support member 620 may be located between the display 520 and one or more PCBs (e.g., a first PCB 631, a second PCB 632, and a third PCB 633).

According to an embodiment, the first PCB 631, the second PCB 632, and the third PCB 633 may be disposed on the first support member 610. The second PCB 632 may be disposed on an edge portion of the first support member 610. The third PCB 633 may be disposed on another edge portion of the first support member 610. For example, the first PCB 631 may be electrically connected to the second PCB 632 through a first FPCB 634. For example, the first PCB 631 may be electrically connected to the third PCB 633 through a second FPCB 635. For example, a temperature sensor 531 may be disposed on at least one of the second PCB 632 and the third PCB 633.

According to an embodiment, a battery 550 may be disposed on the second support member 620. The battery 550 may be supported by the second support member 620.

According to an embodiment, the second support member 620 may be moved by the motor 540. For example, the second support member 620 may be slid by the motor 540. For example, the motor 540 may be disposed on the second support member 620. A pinion gear 652 may rotate by being coupled with a shaft of the motor 540. The motor 540 may move a rack gear 651 by rotating the pinion gear 652. As the rack gear 651 disposed on the first support member 610 is moved, the second support member 620 may slide and move with respect to the first support member 610. According to an embodiment, the motor 540 may be disposed on the first support member 610, and the rack gear 651 may be disposed on the second support member 620.

According to an embodiment, the third FPCB 642 may be disposed on the first support member 610 to be parallel to a moving direction of the rack gear 651. A plurality of hall sensors included in the sliding sensor 532 may be disposed on the third FPCB 642. For example, the plurality of hall sensors may be disposed on the third FPCB 642 along a designated interval. The magnetic material 641 may be disposed on the second support member 620. According to the movement of the second support member 620, the magnetic material 641 may be configured to move over the plurality of hall sensors. For example, the magnetic material 641 may correspond to the magnetic material 452 of FIG. 4.

Figure 7A:
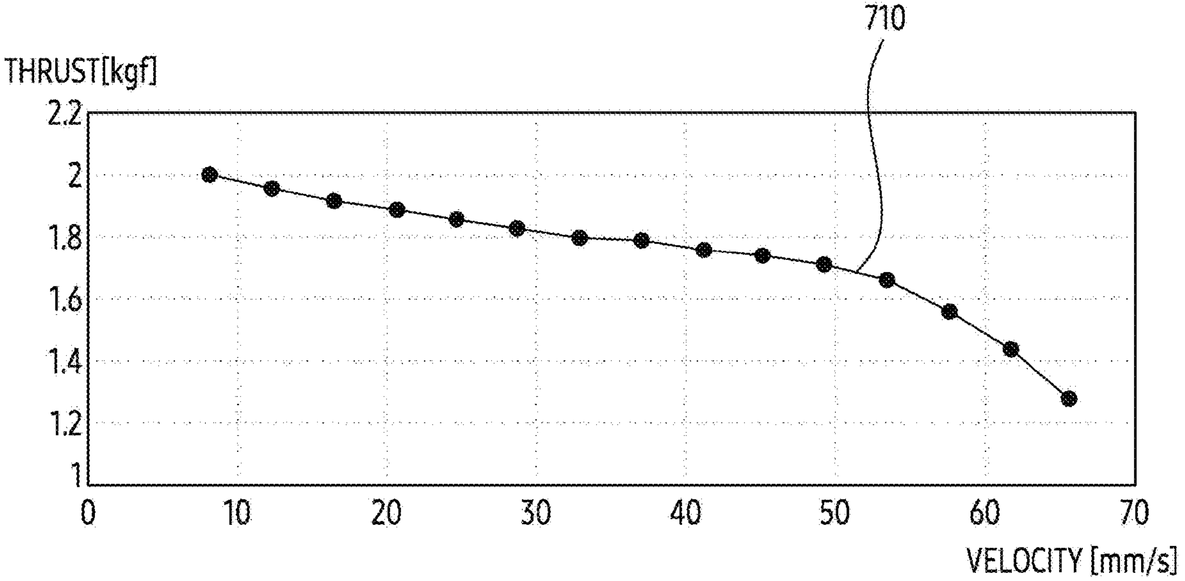
FIG. 7A is a graph illustrating an example of a change in thrust of a motor according to a rotation velocity of the motor, according to various embodiments.

FIG. 7A is a graph illustrating an example of a change in thrust of a motor according to a rotation velocity of the motor, according to various embodiments.

Figure 7B:
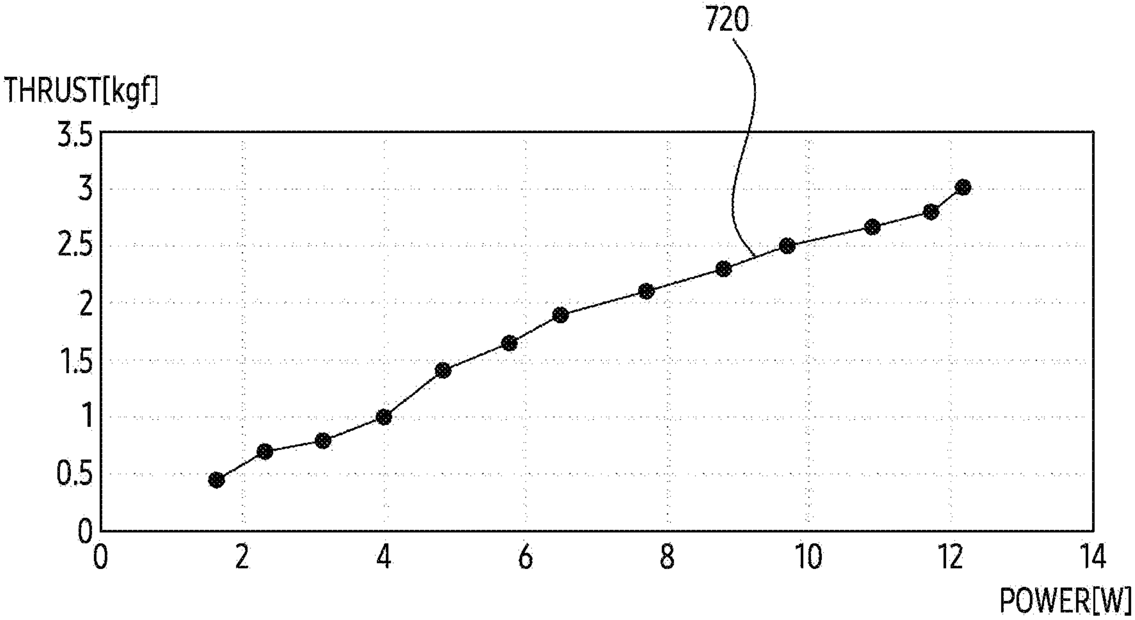
FIG. 7B is a graph illustrating an example of a change in thrust of a motor according to power applied to the motor, according to various embodiments.

FIG. 7B is a graph illustrating an example of a change in thrust of a motor according to power applied to the motor, according to various embodiments.

Figure 7C:
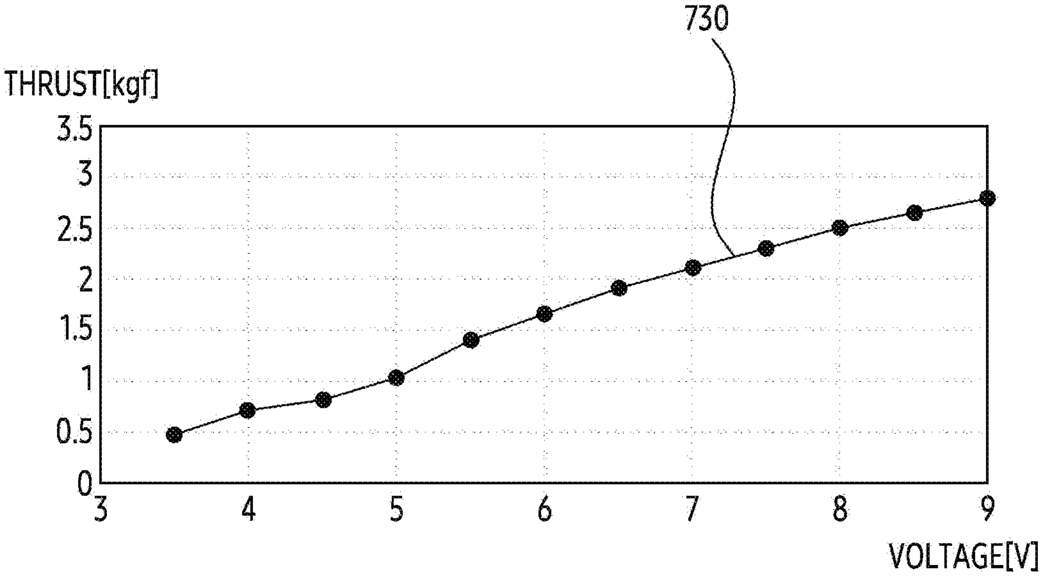
FIG. 7C is a graph illustrating an example of a change in thrust of a motor according to voltage applied to the motor, according to various embodiments.

FIG. 7C is a graph illustrating an example of a change in thrust of a motor according to voltage applied to the motor, according to various embodiments.

Referring to FIGS. 7A to 7C, a processor 510 may operate a motor 540 to change a display area of a display 520 (i.e., roll or unroll the display 520). The thrust of the motor 540 should be set to be greater than the thrust (or driving force) required to change the display area of the display 520. The thrust (or driving force) required to change the display area of the display 520 may be changed according to various situations. As used herein, "change a display area of a display" may mean "roll or unroll the display" or "change a size of the display area".

For example, when a state of the display 520 is maintained (i.e., has been maintained) for a certain period of time or longer, physical property of the display 520 may be changed. When the physical property of the display 520 are changed, magnitude of the thrust required to change the display area of the display 520 may increase.

For another example, when a temperature of the display 520 is below a designated temperature (or in a low temperature environment), the material (or physical property) of the internal stacked composition of the display 520 may harden. When the temperature of the display 520 is less than or equal to the designated temperature (or in the low temperature environment), the property of the display 520 may change from a flexible property to a rigid property. When the property of the display 520 is changed to the rigid property, the thrust (or driving force) required to change the display area of the display 520 (i.e., roll or unroll the display 520) may increase.

As another example, a foreign material may be introduced into a gap between apparatuses (e.g., the motor 540, the display 520, the first support member 610, or the second support member 620) for changing the display area of the display 520. When the foreign material is introduced into the gap between apparatuses for changing the display area of the display 520, the thrust required to change the display area of the display 520 may increase.

As another example, an impact may occur on the electronic device 500. The impact may occur on the electronic device 500 due to falling. When the impact occurs in the electronic device 500, deformation (or failure) may occur in the apparatuses for changing the display area of the display 520. When the deformation (or failure) occurs in the apparatuses for changing the display area of the display 520, the thrust required to change the display area of the display 520 may increase.

According to an embodiment, the processor 510 may change the display area of the display 520 (i.e., roll or unroll the display 520) by generating an appropriate thrust to the motor 540 according to the above-described various situations. For example, the processor 510 may always drive the motor 540 at the maximum power. When the motor 540 is always driven at the maximum power, power consumption may increase. As another example, the processor 510 may change the thrust of the motor 540 by changing the current in a state in which a constant voltage is applied to the motor 540. When the thrust of the motor 540 is changed by changing the current in the state in which the constant voltage is applied, power loss may increase. For another example, the processor 510 may change the thrust by changing the rotation velocity of the motor 540. For another example, the processor 510 may change the thrust by changing the voltage or current applied to the motor 540.

Referring to FIG. 7A, the processor 510 may change the thrust by changing the rotation velocity of the motor 540. The velocity at which the second housing moves may be changed according to the rotation velocity of the motor 540. Graph 710 represents a change in thrust according to the velocity at which the second housing moves. X-axis of the graph 710 represents the velocity at which the second housing moves. The unit of the velocity at which the second housing of the motor 540 moves is millimeters per second (mm/s). Y-axis of the graph 710 represents thrust. The unit of the thrust is kilogram-force (kgf).

According to an embodiment, the processor 510 may increase the thrust by reducing the velocity at which the second housing moves. In other words, the processor 510 may increase the thrust by reducing the rotation velocity of the motor 540. For example, when the velocity at which the second housing moves is 8 mm/s, the thrust may be set to 2 kgf. When the velocity at which the second housing moves is 35 mm/s, the thrust may be set to 1.8 kgf. Referring to the graph 710, even when the rotation velocity of the motor 540 is significantly reduced, the thrust may not be significantly changed.

Referring to FIG. 7B, the processor 510 may change the thrust by changing power applied to the motor 540. The graph 720 represents a change in thrust according to the power applied to the motor 540. The x-axis of the graph 720 represents power applied to the motor 540. The unit of the power applied to the motor 540 is watt (W). The y-axis of the graph 720 represents thrust. The unit of the thrust is kgf.

According to an embodiment, the processor 510 may increase the thrust by increasing the power applied to the motor 540. For example, the processor 510 may change the thrust of the motor 540 from 0.6 kgf to 3 kgf, by changing the power applied to the motor 540 from 2 W to 12 W. The processor 510 may change the thrust of the motor 540 by changing the power applied to the motor 540 according to various situations. The processor 510 may apply power according to the thrust required to change the display area of the display 520 to the motor 540. The processor 510 may minimize power consumption by applying power according to the thrust required to change the display area of the display 520 (i.e., roll or unroll the display 520) to the motor 540.

Referring to FIG. 7C, the processor 510 may change the thrust by changing voltage applied to the motor 540. Graph 730 represents a change in the thrust according to the voltage applied to the motor 540. The x-axis of the graph 730 represents a voltage applied to the motor 540. The unit of the voltage applied to the motor 540 is V. The y-axis of the graph 730 represents the thrust. The unit of the thrust is kgf.

According to an embodiment, the processor 510 may increase the thrust by increasing the voltage applied to the motor 540. The processor 510 may identify the thrust required to change the display area of the display 520 in various situations. The processor 510 may apply a voltage according to the thrust required to change the display area of the display 520 to the motor 540.

According to an embodiment, the processor 510 may identify (or set) voltage, current, power, and velocity (e.g., the velocity at which the second housing moves) to be set according to the thrust required to change the display area of the display 520 as shown in Table 1.

TABLE 1

| | voltage applied to Motor [V] | current applied to Motor [A] | power consumption [W] | thrust [kgf] | velocity [mm/s] |
|---|---|---|---|---|---|
| 1 | 9.0 | 1.35 | 12.15 | 3.00 | 17 |
| 2 | 9.0 | 1.30 | 11.70 | 2.80 | 35 |
| 3 | 8.5 | 1.28 | 10.88 | 2.65 | |
| 4 | 8.0 | 1.21 | 9.68 | 2.50 | |
| 5 | 7.5 | 1.17 | 8.78 | 2.30 | |
| 6 | 7.0 | 1.10 | 7.70 | 2.10 | |
| 7 | 6.5 | 1.00 | 6.50 | 1.90 | |
| 8 | 6.0 | 0.96 | 5.76 | 1.65 | |
| 9 | 5.5 | 0.88 | 4.84 | 1.40 | |
| 10 | 5.0 | 0.80 | 4.00 | 1.00 | |
| 11 | 4.5 | 0.70 | 3.15 | 0.80 | |
| 12 | 4.0 | 0.58 | 2.32 | 0.70 | |
| 13 | 3.5 | 0.47 | 1.65 | 0.45 | |

Referring to Table 1, the processor 510 may change the voltage applied to the motor 540 and the velocity at which the second housing moves, according to the thrust required to change the display area of the display 520 (i.e., roll or unroll the display 520). The current applied to the motor 540 and the power applied to the motor 540 may be set based on the voltage applied to the motor 540. For example, the processor 510 may identify that the thrust required to change the display area of the display 520 is 0.7 kgf. The processor 510 may apply a voltage of 4.0 V to the motor 540 and set the velocity at which the second housing moves to 35 mm/s, in order to set the thrust to 0.7 kgf.

For another example, the processor 510 may identify that the thrust required to change the display area of the display 520 is 1.4 kgf. The processor 510 may apply a voltage of 5.5 V to the motor 540, and set the velocity at which the second housing moves to 35 mm/s, in order to set the thrust to 1.4 kgf.

For another example, the processor 510 may identify that the thrust required to change the display area of the display 520 is 3.0 kgf. The processor 510 may apply a voltage of 9.0 V to the motor 540, and set the velocity at which the second housing moves to 17 mm/s, in order to set the thrust to 3.0 kgf.

A value illustrated in Table 1 described above is an example, and a specific value may be changed.

Figure 8:
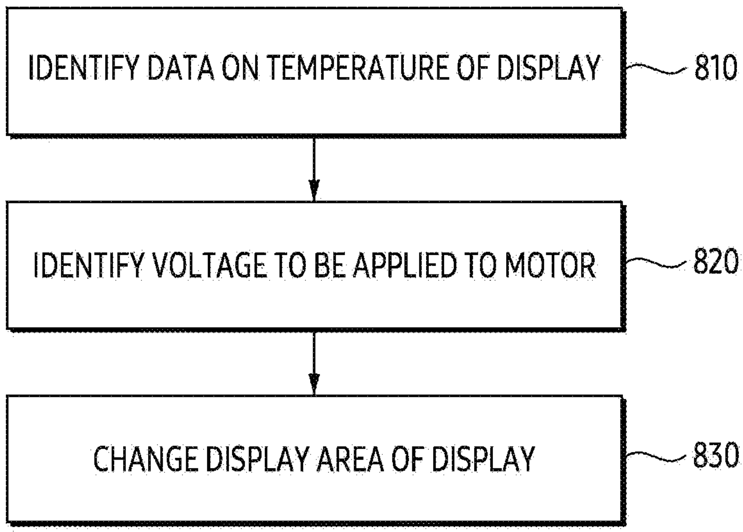
FIG. 8 is a flowchart illustrating an operation of an electronic device, according to various embodiments.

FIG. 8 is a flowchart illustrating an operation of an electronic device, according to various embodiments.

Referring to FIG. 8, the thrust required to change a display area of a display 520 may be set as illustrated in Table 2 according to a temperature of the display 520.

TABLE 2

| | room temperature (25° C.) | −10° C. | −20° C. |
|---|---|---|---|
| thrust | 1 F | 3 F | 6 F |

Referring to Table 2, the thrust required to change the display area of the display 520 (i.e., roll or unroll the display 520) based on room temperature may be expressed as 1 F (e.g., 1 kgf). The thrust required to change the display area of the display 520 at −10° C. may be expressed as 3 F. The thrust required to change the display area of the display 520 at −10° C. may be set to be three times larger than the thrust required at room temperature. The thrust required to change the display area of the display 520 at −20° C. may be expressed as 6 F. The thrust required to change the display area of the display 520 at −20° C. may be set to be six times larger than the thrust required at room temperature. Table 2 is exemplary and may be changed according to a shape and/or material of the display 520. In operations 810 to 830, the processor 510 may change the thrust by changing the voltage applied to the motor 540 based on data of the temperature of the display 520.

In operation 810, the processor 510 may identify data on the temperature of the display 520. For example, the processor 510 may identify data on the temperature of the display 520 (e.g., flexible display) through the sensor 530 (or at least one sensor), based on an input for changing the display area of the display 520.

According to an embodiment, the processor 510 may identify an input for changing a display area of the display 520. For example, the processor 510 may identify an input for extending the display area of the display 520. For another example, the processor 510 may identify an input for reducing the display area of the display 520.

According to an embodiment, an input for changing the display area of the display 520 may be variously set. For example, the input for changing the display area of the display 520 may be set to an input for a physical button exposed through a portion of a housing (e.g., the first housing or the second housing) of the electronic device 500. For another example, the input for changing the display area of the display 520 may be set to a touch input for an executable object. For another example, the input for changing the display area of the display 520 may be set to a user input identified in an external electronic device (e.g., earbuds or smart watch) connected to the electronic device 500.

According to an embodiment, the sensor 530 may include a temperature sensor 531 (or a thermistor). The temperature sensor 531 may be disposed on at least one of a second PCB 632 and a third PCB 633 disposed on the first support member 610. The processor 510 may identify data on the temperature of the display 520 through the temperature sensor 531.

In operation 820, the processor 510 may identify (e.g., determine) the voltage to be applied to the motor 540 through an integrated circuit (e.g., the first integrated circuit 561). For example, the processor 510 may identify (e.g., determine) the voltage to be applied to the motor 540 through the integrated circuit, based on the identified temperature data.

According to an embodiment, the processor 510 may apply a voltage to the motor 540 through the integrated circuit. The processor 510 may change the voltage applied to the motor 540 by changing the voltage provided from the battery 550 through the integrated circuit. For example, the processor 510 may change the voltage provided from the battery 550 through the integrated circuit to a voltage identified (e.g., determined) based on the data on the identified temperature. The processor 510 may apply the voltage identified through the integrated circuit to another integrated circuit (e.g., the second integrated circuit 562). The processor 510 may apply the determined voltage to the motor 540 through the other integrated circuit to which the voltage identified from the integrated circuit is applied.

In operation 830, the processor 510 may change a display area of the display 520. For example, the processor 510 may change the display area of the display 520 (i.e., roll or unroll the display 520) by applying the determined voltage to the motor 540 through the integrated circuit. The processor 510 may change the display area of the display 520 by controlling the integrated circuit, in order to apply the determined voltage to the motor 540.

For example, the processor 510 may rotate a pinion gear coupled to a shaft of the motor 540, by applying the determined voltage to the motor 540. The processor 510 may move a rack gear by rotating the pinion gear. The processor 510 may move the second support member 620 with respect to the first support member 610, by moving the rack gear disposed in the first support member 610. The display area of the display 520 may be changed according to the movement of the second support member 620.

For example, the processor 510 may identify a velocity of the motor 540 and a current applied to the motor 540 based on the determined voltage. The processor 510 may control the motor 540 through another integrated circuit (e.g., the second integrated circuit 562), based on the identified velocity and the identified current.

Figure 9A:
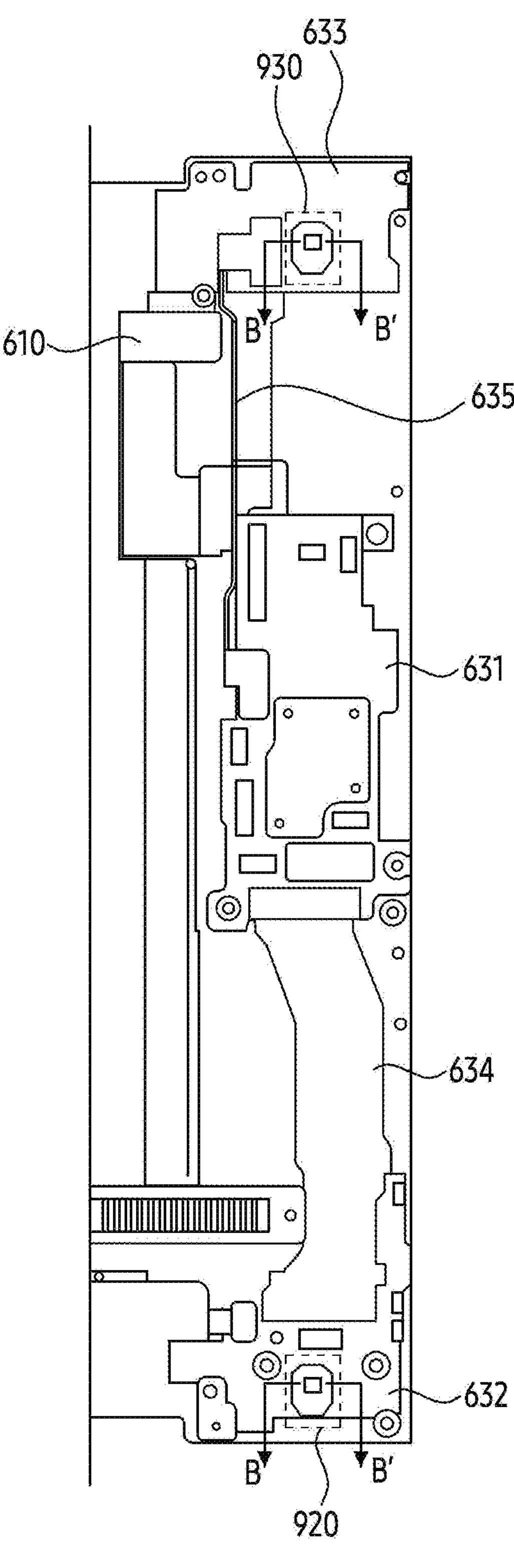
FIG. 9A illustrates an example of a temperature sensor disposed on a PCB.

FIG. 9A illustrates an example of a temperature sensor disposed on a PCB.

Figure 9B:
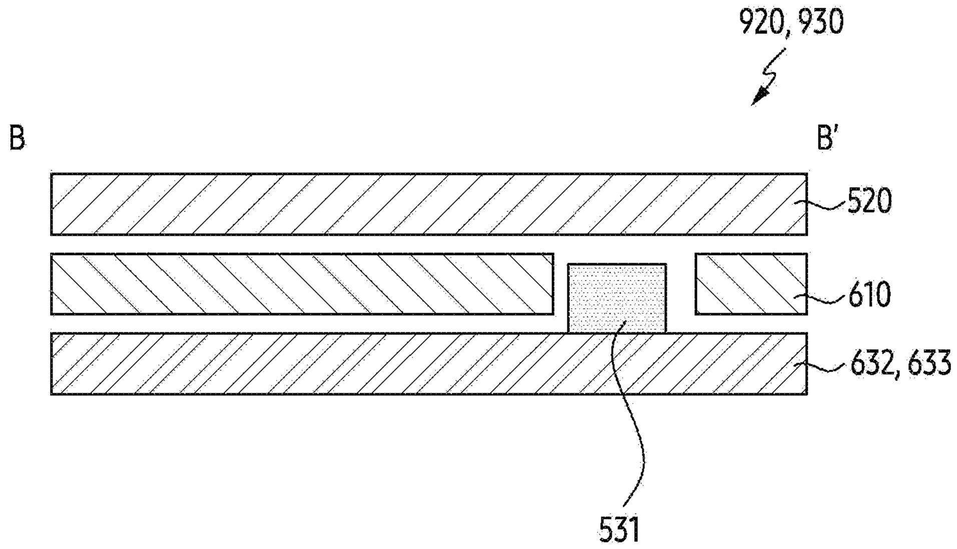
FIG. 9B is a section view of an electronic device cut along line B-B' of FIG. 9A, according to various embodiments.

FIG. 9B is a section view of an electronic device cut along line B-B' of FIG. 9A, according to various embodiments.

Referring to FIG. 9A, FIG. 9A may represent a portion (e.g., a portion of the right) of the first support member 610 of FIG. 6A or 6B. One or more PCBs may be disposed in a first support member 610 included in a first housing (e.g., the first housing 210 of FIG. 2A). For example, a first PCB 631, a second PCB 632, and a third PCB 633 may be disposed on the first support member 610. The first PCB 631 and the second PCB 632 may be electrically connected through a first FPCB 634. The first PCB 631 and the third PCB 633 may be electrically connected through a second FPCB 635.

According to an embodiment, a temperature sensor 531 may be disposed on at least one of the one or more PCBs. For example, the temperature sensor 531 may be disposed on at least one of the second PCB 632 and the third PCB 633. For example, the temperature sensor 531 may be disposed on both the second PCB 632 and the third PCB 633.

According to an embodiment, the temperature sensor 531 may be disposed in a PCB on which the temperature sensor 531 is disposed, in order to be spaced apart from at least one electronic component that exceeds a reference heating range, among a plurality of electronic components disposed on the PCB. For example, when the electronic device 500 operates, the temperature sensor 531 may be disposed to be spaced apart from at least one electronic component that generates heat exceeding the reference heating range. The at least one electronic component may include a processor 510 (or application processor (AP)), a power management integrated circuit (PMIC), a motor 540, a memory, and/or a radio frequency (RF) circuit. For example, at least one electronic component that generates heat exceeding the reference heating range may be disposed on the first PCB 631. Accordingly, the temperature sensor 531 may be disposed on one (or at least one) of the second PCB 632 and the third PCB 633.

Referring to FIG. 9B, the temperature sensor 531 may be disposed in an area 920 of the second PCB 632 or an area 930 of the third PCB 633 illustrated in FIG. 9A. FIG. 9B may illustrate an example of a stacked structure including the temperature sensor 531 disposed in the area 920 or the area 930.

For F example, the first support member 610 may be located between one or more PCBs (e.g., the second PCB 632 or the third PCB 633) and the display 520. The temperature sensor 531 may be disposed to be surrounded by the first support member 610, in a state of being disposed on one (or at least one) of the one or more PCBs. The temperature sensor 531 may be disposed closer to the display 520 by being disposed to be surrounded by the first support member 610.

For example, the temperature sensor 531 may be disposed on one (or at least one) of the one or more PCBs toward the display 520. Since the temperature sensor 531 is disposed toward the display 520, the temperature of the display 520 may be more accurately identified.

Figure 10:
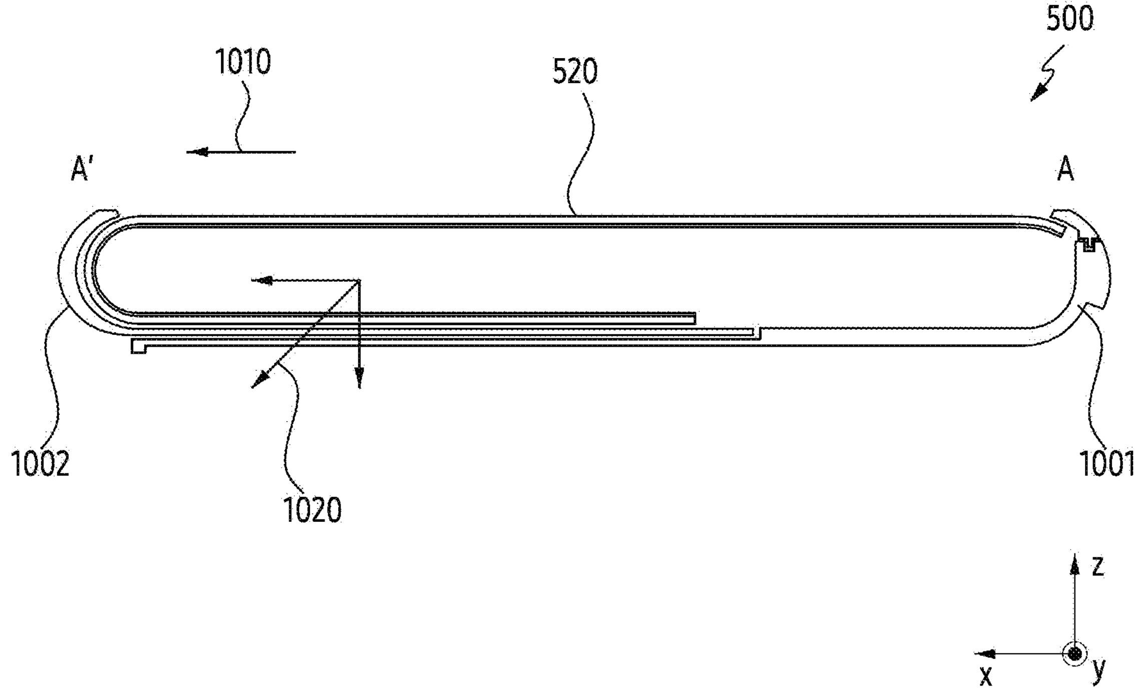
FIG. 10 is a section view of an electronic device cut along line A-A' of FIG. 2A according to various embodiments.

FIG. 10 is a section view of an electronic device cut along line A-A' of FIG. 2A according to various embodiments.

Referring to FIG. 10, thrust required to extend a display area of a display 520 may be different from thrust required to reduce the display area of the display 520.

For example, a second housing 1002 may be moved by a motor 540 along a direction 1010 (or +x-axis direction) with respect to a first housing 1001. The display 520 may be gradually unrolled as a second housing 1002 moves along the direction 1010. The display area of the display 520 may be extended as the second housing 1002 moves along the direction 1010.

For another example, the second housing 1002 may be moved by the motor 540 along a direction (or −x-axis direction) opposite to the direction 1010, with respect to the first housing 1001. The display 520 may be gradually rolled as the second housing 1002 moves along a direction opposite to the direction 1010. The display area of the display 520 may be reduced as the second housing 1002 moves along a direction opposite to the direction 1010.

According to an embodiment, the display 520 may generate a force acting to be unrolled. A direction of the force generated by the display 520 may be a direction 1020. By the force acting in the direction 1020, the thrust required to extend the display area of the display 520 and the thrust required to reduce the display area of the display 520 may be different. For example, the thrust required to reduce the display area of the display 520 may be greater than the thrust required to extend the display area of the display 520. The processor 510 may set the magnitude of the voltage applied to the motor 540 to reduce the display area of the display 520 to be greater than the magnitude of the voltage applied to the motor 540 to extend the display area of the display 520.

According to an embodiment, the thrust required to change the display area of the display 520 (i.e., roll or unroll the display 520) may increase as a time for which the display area of the display 520 is maintained before the change increases.

According to an embodiment, the thrust required to change (e.g., move) the display area of the display 520 in a case that the display area of the display 520 is continuously changed and the thrust required to change the display area of the display 520 after the display area of the display 520 is maintained (e.g., kept) for a pre-designated time may be different and as shown in Table 3.

TABLE 3

| | Extend display area | | Reduce display area | |
|---|---|---|---|---|
| | continue | maintain | continue | Maintain |
| thrust | 1F | 1.44F | 1.2F | 1.62F |

Figure 11:
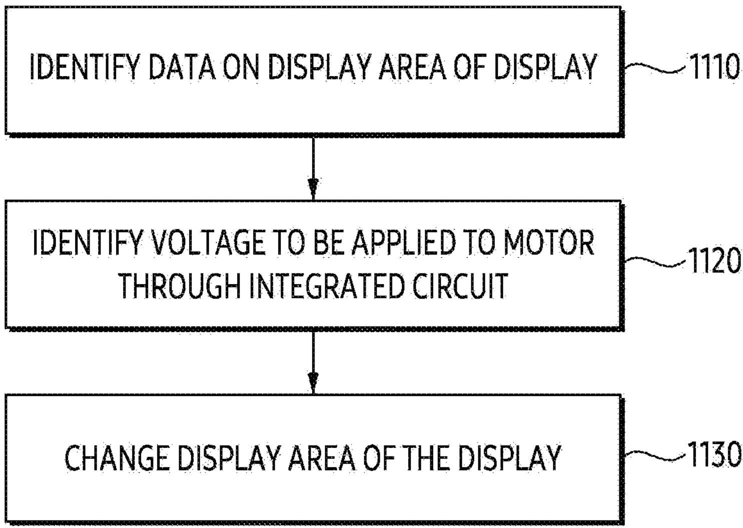
FIG. 11 is a flowchart illustrating an operation of an electronic device, according to various embodiments.

Referring to Table 3, when the display area of the display 520 is continuously changed, the thrust required to extend the display area of the display 520 may be expressed as 1 F (e.g., 1 kgf). When the display area of the display 520 is continuously changed, the thrust required to reduce the display area of the display 520 may be expressed as 1.2 F. When the display area of the display 520 is maintained (i.e., has been maintained) for a pre-designated time, the thrust required to extend the display area of the display 520 after the pre-designated time may be expressed as 1.44 F. When the display area of the display 520 is maintained for a pre-designated time, the thrust required to reduce the display area of the display 520 after the pre-designated time may be expressed as 1.62 F. Table 3 is exemplary and may be changed according to a shape and/or a material of the display 520. FIG. 11 is a flowchart illustrating an operation of an electronic device, according to various embodiments.

Referring to FIG. 11, in operation 1110, the processor 510 may identify data on the display area of the display 520. For example, the processor 510 may identify data on the display area of the display 520 through the sensor 530 (or at least one sensor) based on an input for changing the display area of the display 520.

For example, the data on the display area of the display 520 may include data on a size of the display area of the display 520. The processor 510 may identify a state of the display 520 based on the data on the display area of the display 520. For example, the display area of the display 520 may be set to be the smallest in a first state. The processor 510 may identify that a state of the display 520 is the first state, based on identifying the display area of the display 520 being the first display area set to the smallest. As another example, the display area of the display 520 may be set to be the largest in a second state. The processor 510 may identify that the state of the display 520 is the second state, based on identifying the display area of the display 520 being the second display area set to the largest. According to an embodiment, the state of the display 520 may be set to a third state that is a state between the first state and the second state. The processor 510 may identify that the state of the display 520 is the third state, based on identifying that the display area of the display 520 being the third display area between the first display area and the second display area.

For example, the data on the display area of the display 520 may include data on whether a size of a display area of the flexible display is maintained, increases or decreases. According to an embodiment, the at least one processor may be configured to determine the voltage to be applied to the motor in a case that the size of the display area is maintained for a pre-designated time duration greater than the voltage to be applied to the motor in a case that the size of the display area increases or decreases. According to an embodiment, the at least one processor is configured to determine the voltage to be applied to the motor in a case that the size of the display area decreases greater than the voltage to be applied to the motor in a case that the size of the display area increases.

For example, the sensor 530 may include a sliding sensor 532. The sliding sensor 532 may include a plurality of hall sensors. The plurality of hall sensors may be disposed along a direction in which the second housing slides (or moves). The second housing may include a magnetic material configured to move the plurality of hall sensors as the display area of the display 520 changes. The magnetic material may be disposed in an area of the second support member 620 included in the second housing.

For example, the magnetic power identified through the plurality of hall sensors may be changed according to the location of the magnetic material. The processor 510 may identify data related to the magnetic power identified based on the location of the magnetic material through the plurality of hall sensors. The processor 510 may identify data for the display area of the display 520 based on data related to the magnetic power.

In operation 1120, the processor 510 may identify (e.g., determined) the voltage to be applied to the motor 540 through an integrated circuit. For example, the processor 510 may identify (or determine) the voltage to be applied to the motor 540 through the integrated circuit, based on data on the display area of the display 520. For example, the processor 510 may identify a state of the display 520 based on data on the display area of the display 520. For example, the processor 510 may identify the state of the display 520 as the first state. The processor 510 may identify (or determine) the voltage to be applied to the motor 540 as the first voltage to extend the display area of the display 520. The processor 510 may identify the state of the display 520 as the second state. The processor 510 may identify (or determine) the voltage to be applied to the motor 540 as the second voltage, in order to reduce the display area of the display 520. The first voltage may be set to be lower than the second voltage. The processor 510 may identify (or determine) the first voltage to be applied to the motor 540 to extend the display area of the display 520 to be smaller than the second voltage to be applied to the motor 540 to reduce the display area of the display 520.

In operation 1130, the processor 510 may change the display area of the display 520 (i.e., roll or unroll the display 520). For example, the processor 510 may change the display area of the display 520 by applying the determined voltage to the motor 540 through the integrated circuit. Operation 1130 may correspond to operation 830 of FIG. 8.

Figure 12:
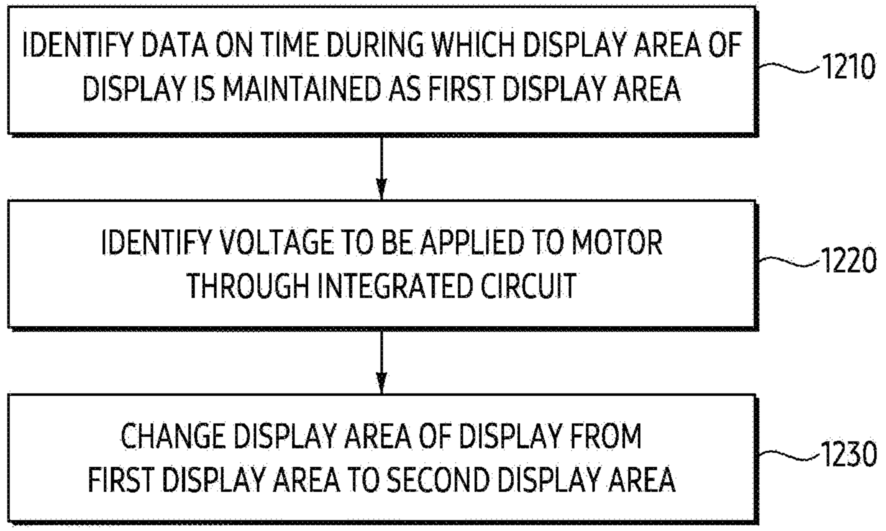
FIG. 12 is a flowchart illustrating an operation of an electronic device, according to various embodiments.

FIG. 12 is a flowchart illustrating an operation of an electronic device, according to various embodiments.

Referring to FIG. 12, in operation 1210, a processor 510 may identify data on a time during which a display area of a display 520 is maintained as a first display area. For example, based on an input for changing the display area of the display 520 from the first display area to a second display area, the processor 510 may identify data on a time during which the display area of the display 520 is maintained (i.e., has been maintained) as the first display area through a sensor 530 (or at least one sensor).

For example, as the time during which the display area of the display 520 is maintained as the first display area is long, the thrust required to change the display area of the display 520 from the first display area to the second display area may increase.

In operation 1220, the processor 510 may identify (e.g., determine) a voltage to be applied to the motor 540 through an integrated circuit. For example, the processor 510 may identify (or determine) the voltage to be applied to the motor 540 through the integrated circuit, based on data on the time during which the display area of the display 520 is maintained as the first display area.

For example, the processor 510 may identify whether the time during which the display area of the display 520 is maintained (i.e., has been maintained) as the first display area is equal to or greater than a designated time. As an example, the processor 510 may identify (or determinc) the voltage to be applied to the motor 540 as the first voltage, based on that the time during which the display area of the display 520 is maintained as the first display area is greater than or equal to a pre-designated time. The processor 510 may identify (or determine) the voltage to be applied to the motor 540 as the second voltage, based on that the time during which the display area of the display 520 is maintained as the first display area is less than the pre-designated time. The first voltage may be set to be greater than the second voltage.

In operation 1230, the processor 510 may change the display area of the display from the first display area to the second display area. For example, the processor 510 may change the display area of the display 520 from the first display area to the second display area, by applying the determined voltage to the motor 540 through an integrated circuit (e.g., the first integrated circuit 561). For example, the processor 510 may change the display area of the display 520 from the first display area to the second display area, by controlling the integrated circuit (e.g., the first integrated circuit 561) to apply the determined voltage to the motor 540. Operation 1230 may correspond to operation 830 of FIG. 8.

Figure 13A:
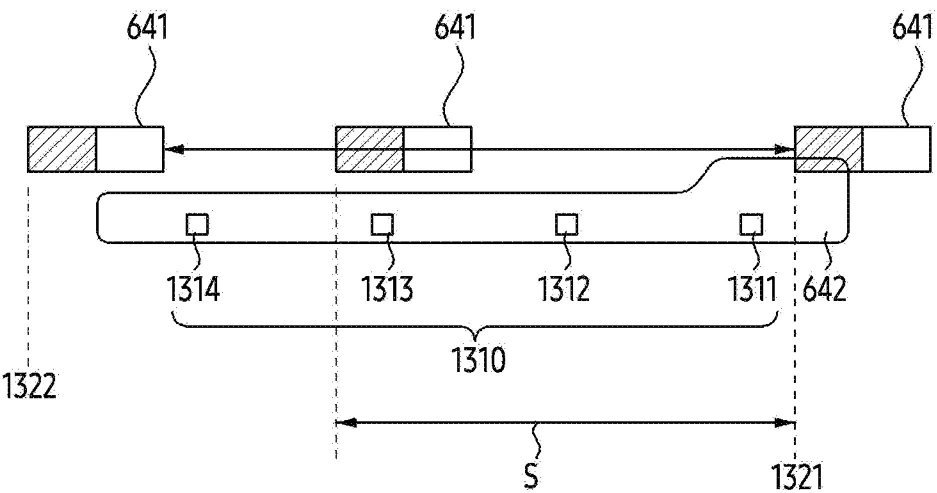
FIG. 13A illustrates an example of a sliding sensor, according to various embodiments.

FIG. 13A illustrates an example of a sliding sensor, according to various embodiments.

Figure 13B:
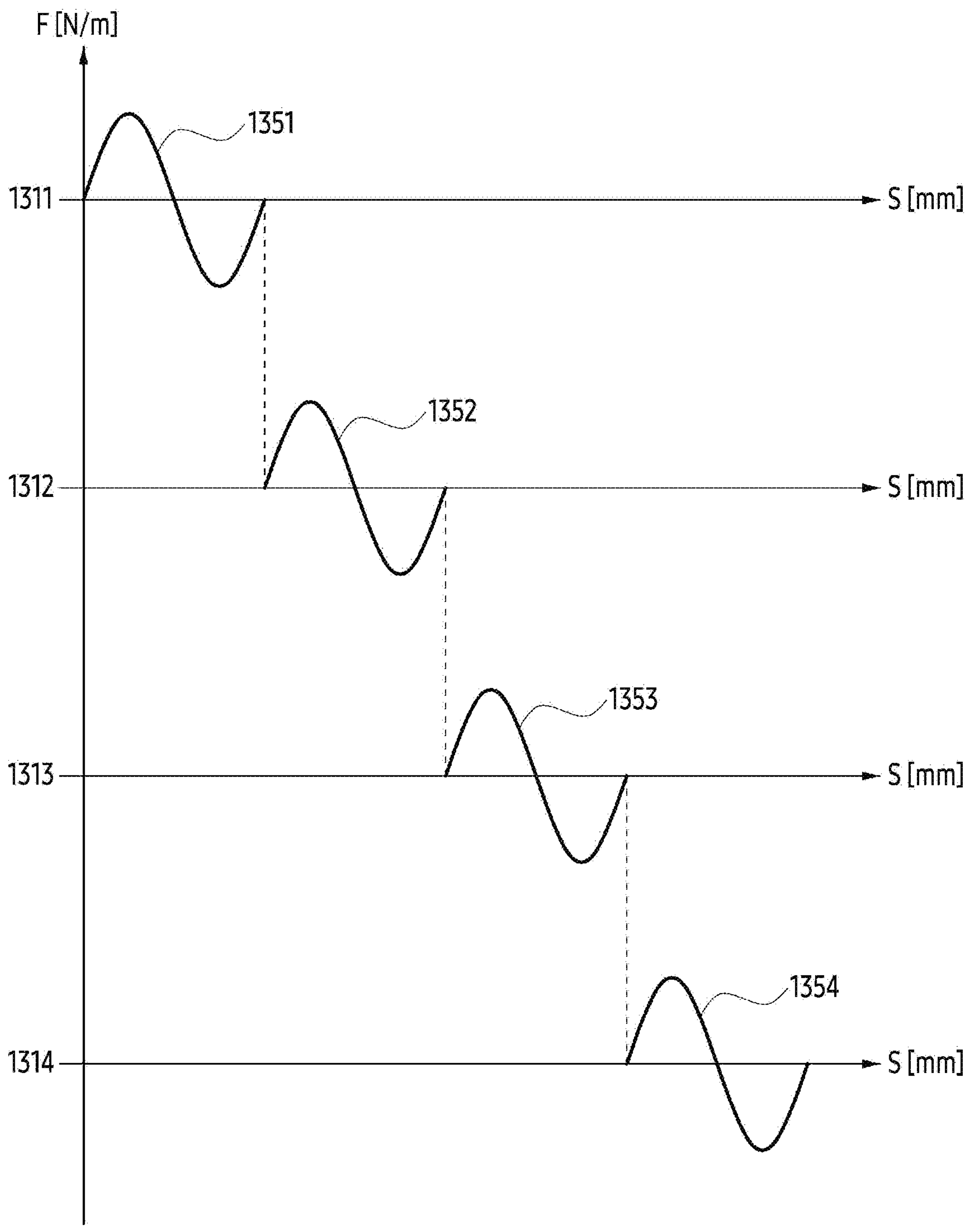
FIG. 13B illustrates an example of magnitude of magnetic power identified through a plurality of hall sensors of a sliding sensor, according to various embodiments.

FIG. 13B illustrates an example of magnitude of magnetic power identified through a plurality of hall sensors of a sliding sensor, according to various embodiments.

Referring to FIG. 13A, a third FPCB 642 may be disposed on a first support member 610 to be parallel to a moving direction of a second housing (or a second support member 620 and a rack gear 651). A sliding sensor 532 including a plurality of hall sensors 1310 may be disposed on the third FPCB 642. For example, the plurality of hall sensors 1310 may be disposed on the third FPCB 642 along a designated interval. According to the movement of the second support member 620, a magnetic material 641 disposed in the second support member 620 may be configured to move over the plurality of hall sensors 1310.

For example, the plurality of hall sensors 1310 may include a first hall sensor 1311, a second hall sensor 1312, a third hall sensor 1313, and a fourth hall sensor 1314. The magnetic material 641 may be disposed at a location 1321 in a first state in which a display area of a display 520 is minimized. The magnetic material 641 may be disposed at a location 1322 in a second state in which the display area of the display 520 is maximized. As the magnetic material 641 is moved from the location 1321 to the location 1322, magnitude of magnetic power identified by the plurality of hall sensors 1310 may be changed. An example of the magnitude of the magnetic power identified by the plurality of hall sensors 1310 may be described with reference to FIG. 13B.

Referring to FIG. 13B, a distance at which the magnetic material 641 is moved from the location 1321 may be referred to as s. A graph 1351 represents a change in the magnitude of the magnetic power according to a distance (i.e., S) identified by the first hall sensor 1311. A graph 1352 represents a change in the magnitude of the magnetic power according to the distance (i.e., S) identified by the second hall sensor 1312. A graph 1353 represents a change in the magnitude of the magnetic power according to the distance (i.e., S) identified by the third hall sensor 1313. A graph 1354 represents a change in the magnitude of the magnetic power according to the distance (i.e., S) identified by the fourth hall sensor 1314. In graphs 1351 to 1354, the x-axis represents the distance (i.e., S) at which the magnetic material 641 is moved from the location 1321. The unit of the x-axis is millimeter (mm). In graphs 1351 to 1354, the y-axis represents the magnitude of the magnetic power. The unit of the y-axis is N/m.

According to an embodiment, the magnitude of the magnetic power identified by the plurality of hall sensors 1310 may be changed according to a change in S. The processor 510 may identify data related to the magnetic power identified by the plurality of hall sensors 1310. For example, the processor 510 may identify data on the magnetic power identified based on a location of the magnetic material 641, through the plurality of hall sensors 1310. The processor 510 may identify data on the display area of the display 520, based on data on the magnetic power. The processor 510 may identify a state of the display 520, based on the data related to the magnetic power. The processor 510 may identify the size of the display area of the display 520, based on the data related to the magnetic power. The processor 510 may identify a distance where the second housing is moved with respect to the first housing, based on the data related to the magnetic power.

FIGS. 13A and 13B illustrate an example in which the plurality of hall sensors are included in the sliding sensor 532 to identify data on the display area of the display 520, but are not limited thereto. According to an embodiment, the sliding sensor 532 may be configured as a sensor for identifying a change in capacitance or inductance. According to an embodiment, the sliding sensor 532 may be configured as a physical switch for identifying data for the display area of the display 520.

Figure 14:
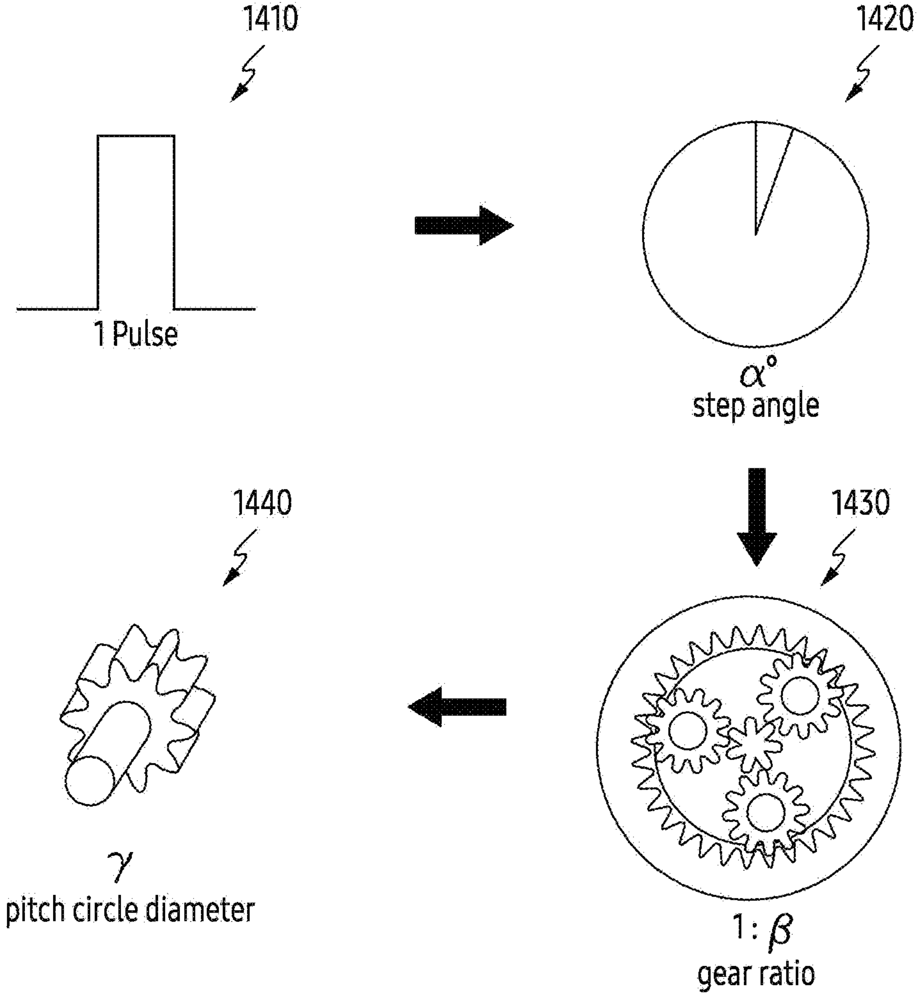
FIG. 14 illustrates an example of changing a display area of a display based on a pulse in a motor according to various embodiments.

FIG. 14 illustrates an example of changing a display area of a display based on a pulse according to various embodiments.

Referring to FIG. 14, in a state 1410, a processor 510 may apply a voltage to a motor 540 (e.g., a step motor) through one pulse (or step signal). For example, the processor 510 may identify a voltage to be applied to the motor 540. The processor 510 may apply the determined voltage from an integrated circuit (e.g., the first integrated circuit 561) to another integrated circuit (e.g., the second integrated circuit 562). The processor 510 may apply the determined voltage to the motor 540 from another integrated circuit. For example, the processor 510 may apply the determined voltage based on one pulse.

In a state 1420, the processor 510 may rotate the motor 540 by a degree, by applying one pulse to the motor 540. For example, a step angle of the step motor may be set to α (alpha). In a state 1430 and a state 1440, a gear ratio of a reducer inside the motor 540 may be set to 1: β (beta). A pitch circuit diameter (PCD) of a pinion gear may be set to γ (gamma). The processor 510 may rotate the pinion gear by rotating the motor 540.

Through states 1410 to 1440, the processor 510 may rotate the pinion gear by applying one pulse to the motor 540. As the pinion gear rotates, a distance s (e.g., S in FIG. 13A) at which the rack gear moves may be set as shown in Equation 1.

$$s = 1 \times \frac{\alpha}{360} \times \frac{1}{\beta} \times \gamma \times \pi \quad \text{[Equation 1]}$$

Referring to Equation 1, the distance s represents a distance at which the rack gear is moved as the pinion gear rotates. α (alpha) of the step motor represents a step angle of the motor 540. β (beta) represents a gear ratio of the reducer inside the motor 540. γ (gamma) represents PCD.

For example, the step angle may be 18 degrees, the gear ratio may be set to 1:31.04 and the PCD may be set to 2.9 mm. In this case, one pulse is applied to the motor 540, and the distance s at which the rack gear moves may be set as shown in Equation 2.

$$1 \times \frac{18}{360} \times \frac{1}{31.04} \times 2.9 \times \pi = 0.014 \quad \text{[Equation 2]}$$

Referring to Equation 2, when the step angle is 18 degrees, the gear ratio is set to 1:31.04 and the PCD is set to 2.9 mm, as one pulse is applied to the motor 540, and the distance s at which the rack gear moves may be set to 0.014 mm.

According to an embodiment, the processor 510 may move a second housing 220 (or the second support member 620) by applying the determined voltage based on a plurality of pulses to the motor 540. The processor 510 may change the display area of the display 520 by applying the voltage identified based on the plurality of pulses to the motor 540.

According to an embodiment, the processor 510 may change an interval of the plurality of pulses. The processor 510 may change a rotation velocity of the motor 540 by changing the interval of the plurality of pulses. The processor 510 may change a velocity at which the display area of the display 520 is changed, by changing the interval of the plurality of pulses. For example, the processor 510 may increase the velocity at which the display area of the display 520 is changed, by reducing the interval of the plurality of pulses.

According to an embodiment, the thrust required to change the display area of the display 520 may increase according to various causes. For example, a foreign material may be introduced into a gap between apparatuses (e.g., the motor 540, the display 520, the first support member 610, or the second support member 620) for changing the display area of the display 520. By introducing the foreign material into the gap between the apparatuses for changing the display area of the display 520, the thrust required to change the display area of the display 520 may increase.

Figure 15:
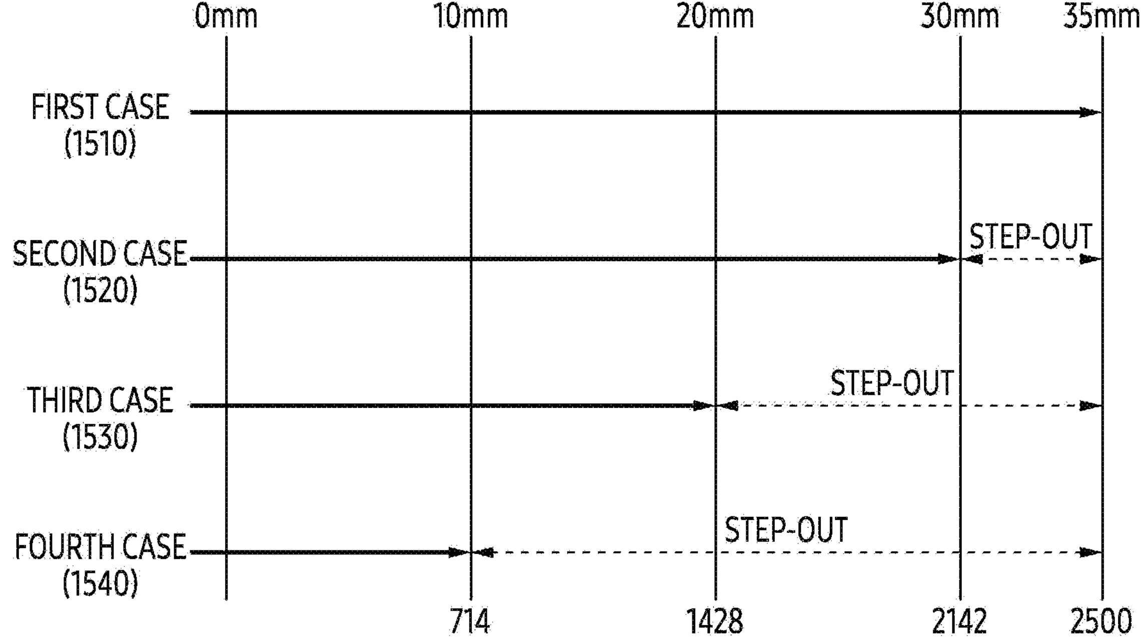
FIG. 15 illustrates an example of an operation of an electronic device for identifying a step-out rate of a motor, according to various embodiments.

According to an embodiment, when the thrust of the motor 540 is less than the thrust required to change the display area of the display 520, step-out may occur in the motor 540. For example, the step-out may occur in at least a part of the plurality of pulses applied to the motor 540. When the step-out occurs in at least a part of the plurality of pulses applied to the motor 540, the display area of the display 520 may not be changed according to rotation of the motor 540. The processor 510 may identify a step-out rate of the motor 540 and change the voltage applied to the motor 540 based on the step-out rate of the motor 540, so that step-out does not occur. In FIG. 15 below, an example of an operation in which the processor 510 identifies the step-out rate of the motor 540 may be described.

FIG. 15 illustrates an example of an operation of an electronic device for identifying a step-out rate of a motor, according to various embodiments.

Referring to FIG. 15, in a first case 1510, a pre-designated voltage may be applied to a motor 540 based on a first number (e.g., 2500) of pulses. In the first case 1510, step-out may not occur in the motor 540. The processor 510 may move the second housing by a first distance (e.g., 35 mm) by applying the pre-designated voltage to the motor 540, based on the first number of pulses. The processor 510 may change a display area of a display 520 from a first display area to a second display area, by applying the pre-designated voltage to the motor 540, based on the first number of pulses. The processor 510 may change a state of the display 520 from a first state to a second state, by applying the pre-designated voltage to the motor 540, based on the first number of pulses. For example, the processor 510 may identify the number of pulses for changing the state of the display 520 from the first state to the second state as the first number, in a state in which the step-out of the motor 540 does not occur.

In a second case 1520, the pre-designated voltage, which is the same voltage used in the first case 1510, may be applied to the motor 540, based on the first number (e.g., 2500) of pulses. The processor 510 may apply the pre-designated voltage to the motor 540 based on the first number of pulses. In the second case 1520, step-out may occur in the motor 540.

For example, the processor 510 may identify that a second housing has been moved by a second distance (e.g., 30 mm) after the pre-designated voltage is applied to the motor 540. The processor 510 may identify a corresponding number of pulses for moving the second housing by the second distance (e.g., 30 mm) if the step-out of the motor 540 does not occur (i.e., first case 1510) as a second number (e.g., 2142). The processor 510 may identify the corresponding number of pulses for moving the second housing by the second distance as the second number based on a distance (e.g., 0.014 mm) at which the second housing moves according to one pulse in the first case 1510.

For another example, the processor 510 may identify that a state of the display 520 is a third state (e.g., 30 mm movement) distinct from the second state (e.g., 35 mm movement) after the pre-designated voltage is applied to the motor 540 based on the first number of pulses in the second case. The processor 510 may identify the number of corresponding pulses for changing the state of the display 520 from the first state to the third state if it is the first case 1510, as the second number.

The processor 510 may identify the step-out rate of the motor 540 based on the first number and the second number. For example, the step-out rate of the motor 540 may be set as shown in Equation 3.

$$p = \frac{f1 - f2}{f1} \times 100 \quad \text{[Equation 3]}$$

Referring to Equation 3, p may represent a step-out rate (%). f1 may represent the first number. f2 may represent the second number.

For example, in the second case 1520, a step-out rate of the motor 540 may be 14.4% since f1 is 2500 and f2 is 2142. The processor 510 may identify the step-out rate of the motor 540 as 14.4%, based on identifying that the second housing has been moved by a second distance (e.g., 30 mm) after applying the pre-designated voltage to the motor 540 based on the first number of pulses.

In a third case 1530, the pre-designated voltage, which is the same voltage used in the first case 1510, may be applied to the motor 540, based on the first number (e.g., 2500) of pulses. The processor 510 may apply the pre-designated voltage to the motor 540, based on the first number of pulses. In the third case 1530, the step-out may occur in the motor 540. The processor 510 may identify that the second housing has been moved by a third distance (e.g., 20 mm) after the pre-designated voltage is applied to the motor 540. The processor 510 may identify a corresponding number of pulses for moving the second housing by a third distance (e.g., 20 mm) if the step-out of the motor 540 does not occur (i.e., first case 1510) as a third number (e.g., 1428). The processor 510 may identify the corresponding number of pulses for moving the second housing by the third distance as the third number, based on a distance (e.g., 0.014 mm) at which the second housing moves according to one pulse in the first case 1510. The processor 510 may identify the step-out rate of the motor 540 based on the first number and the third number. The processor 510 may identify the step-out rate of the motor 540 as 42.8% since f1 is 2500 and f2 is 1428 in the third case 1530.

In a fourth case 1540, the pre-designated voltage, which is the same voltage used in the first case 1510, may be applied to the motor 540, based on the first number (e.g., 2500) of pulses. The processor 510 may apply the pre-designated voltage to the motor 540 based on the first number of pulses. In the fourth case 1540, the step-out may occur in the motor 540. The processor 510 may identify that the second housing has been moved by a fourth distance (e.g., 10 mm) after the pre-designated voltage is applied to the motor 540. The processor 510 may identify a corresponding number of pulses for moving the second housing by the fourth distance (e.g., 10 mm) if the step-out of the motor 540 does not occur (i.e., first case 1510) as a fourth number (e.g., 714). The processor 510 may identify the corresponding number of pulses for moving the second housing by the fourth distance as the fourth number, based on the distance (e.g., 0.014 mm) at which the second housing moves according to one pulse in the first case 1510. The processor 510 may identify the step-out rate of the motor 540 based on the first number and the fourth number. The processor 510 may identify the step-out rate of the motor 540 as 71.4% since f1 is 2500 and f2 is 714 in the fourth case 1540.

According to an embodiment, the processor 510 may identify a new voltage to be applied to the motor 540, based on the identified step-out rate and pre-designated voltage. For example, the processor 510 may identify (or determine) the thrust (or target thrust) of the motor 540 for changing the display area of the display 520, based on the identified step-out rate. The processor 510 may identify (or determine) the voltage to be applied to the motor 540 based on the identified thrust.

For example, the processor 510 may identify the thrust (or target thrust) of the motor 540 for changing the display area of the display 520 (e.g., rolling or unrolling the display 520) according to Equation 4, based on the step-out rate.

$$F_t = F_p \times \left(1 + \frac{p}{100}\right) \quad \text{[Equation 4]}$$

Referring to Equation 4, Ft represents the target thrust. Fp represents the current thrust when step-out occurs. p represents the step-out rate. A driving margin may further be added to the target thrust, according to an embodiment. For example, the driving margin may be set within 10% to 20% of the current thrust.

According to an embodiment, the processor 510 may apply the first voltage to the motor 540, based on the first number of pulses, in order to change the display area of the display 520 from the first display area to the second display area. According to the first voltage, the motor 540 may generate first thrust. After applying the first voltage to the motor 540 based on the first number of pulses, the processor 510 may identify whether the display area of the display 520 has been changed from the first display area to the second display area. After applying the first voltage to the motor 540 based on the first number of pulses, the processor 510 may identify whether the display area of the display 520 has been changed to a third display area distinct from the second display area. The processor 510 may identify that the step-out of the motor 540 has occurred, based on identifying whether the display area of the display 520 has been changed to the third display area. The processor 510 may identify the step-out rate of the motor 540, based on the third display area. The processor 510 may identify thrust for changing the display area of the display 520 to the second display area as second thrust, based on the step-out rate and the first thrust of the motor 540. The processor 510 may identify a second voltage for generating the second thrust. The processor 510 may change the display area of the display 520 to the second display area, by applying the second voltage to the motor 540.

Figure 16:
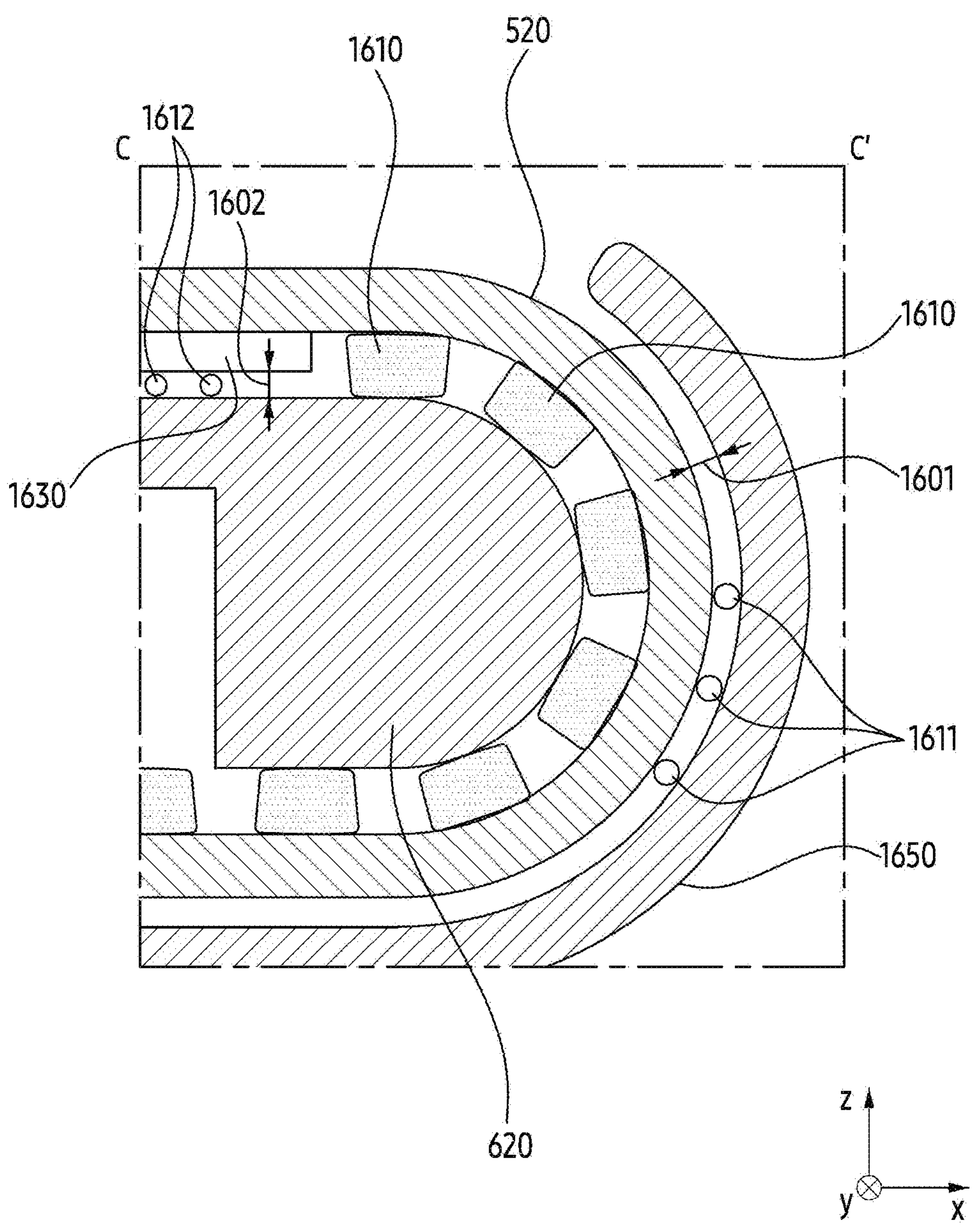
FIG. 16 illustrates a section view of an electronic device cut along line C-C' of FIG. 2A, according to various embodiments.

FIG. 16 illustrates a section view of an electronic device cut along line C-C' of FIG. 2A, according to various embodiments.

Referring to FIG. 16, an electronic device 500 may include a slide cover 1650, a second support member 620, a display 520, a plurality of multi-bars 1610, and a third support member 1630.

For example, the third support member 1630 and the plurality of multi-bars 1610 may be disposed between the second support member 620 and the display 520. The plurality of multi-bars 1610 may be disposed between the second support member 620 and the display 520 along a portion in which the display 520 is rolled. The third support member 1630 may be disposed between the second support member 620 and the display 520 along a display area of the display 520. The display 520 may be configured to be insertable or extractable with the slide cover 1650.

According to an embodiment, the slide cover 1650 may be moved according to the movement of the second support member 620. For example, according to the movement of the second support member 620, the display 520 may be inserted into or extracted from the slide cover 1650. The electronic device 500 may be configured such that the display 520 is inserted into or extracted from the slide cover 1650 according to the movement of the second support member 620. In order for the display 520 to be inserted into or extracted from the slide cover 1650, the electronic device 500 may be configured such that a gap between apparatuses is formed.

According to an embodiment, a foreign material may be introduced into a gap between apparatuses. For example, a foreign material 1611 may be introduced into a first gap 1601 formed between the slide cover 1650 and the display 520. For another example, a foreign material 1612 may be introduced into a second gap 1602 between the second support member 620 and the third support member 1630. When a foreign material is introduced into the gap between apparatuses, the thrust required to change the display area of the display 520 may increase.

According to an embodiment, based on identifying that step-out has occurred in the motor 540, the processor 510 may identify the presence of a foreign material between the display 520 and the second housing (e.g., the slide cover 1650). The processor 510 may identify the presence of a foreign material between the display 520 and the second housing (e.g., the slide cover 1650) based on the step-out rate of the motor 540. Based on identifying the presence between the display 520 and the second housing, the processor 510 may change (or boost) the voltage applied to the motor 540 to change the thrust of the motor 540. The processor 510 may provide a notification through the display 520, based on identifying the presence of a foreign material between the display 520 and the second housing (e.g., the slide cover 1650). For example, the processor 510 may provide a notification indicating to perform an operation to reset the voltage applied to the motor 540 in order to change the display area of the display 520.

Figure 17:
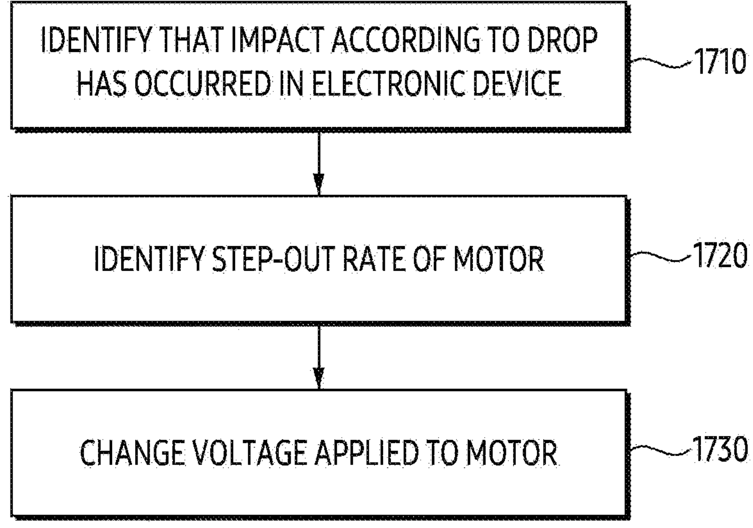
FIG. 17 illustrates an example of an operation of an electronic device according to various embodiments.

FIG. 17 illustrates an example of an operation of an electronic device according to various embodiments.

Referring to FIG. 17, in operation 1710, a processor 510 may identify that an impact caused by dropping on the electronic device 500 has occurred. For example, the processor 510 may identify that an impact caused by dropping on the electronic device 500 has occurred through the sensor 530. For example, the sensor 530 may include an impact detection sensor 533 and a drop detection sensor 534. The processor 510 may identify that an impact caused by dropping has occurred in the electronic device 500, through the impact detection sensor 533 or the drop detection sensor 534.

For example, when an impact occurs due to the dropping on the electronic device 500, the exterior of the electronic device 500 may be changed. As the exterior of the electronic device 500 is changed, a gap between apparatuses for changing a display area of the display 520 may decrease.

In operation 1720, the processor 510 may identify a step-out rate of the motor 540, based on identifying that an impact caused by the dropping has occurred in the electronic device 500.

According to an embodiment, as a gap between apparatuses for changing the display area of the display 520 decreases, the thrust required to change the display area of the display 520 may increase. When the thrust required to change the display area of the display 520 increases, step-out may occur in the motor 540. When the thrust required to change the display area of the display 520 increases, the step-out rate of the motor 540 may increase. The processor 510 may identify the step-out rate of the motor 540 changed according to the impact caused by the dropping.

In operation 1730, the processor 510 may change the voltage applied to the motor 540, in order to change the display area of the display 520, based on the step-out rate of the motor 540. The processor 510 may increase the voltage applied to the motor 540, based on identifying that the step-out rate of the motor 540 has increased.

Figure 18A:
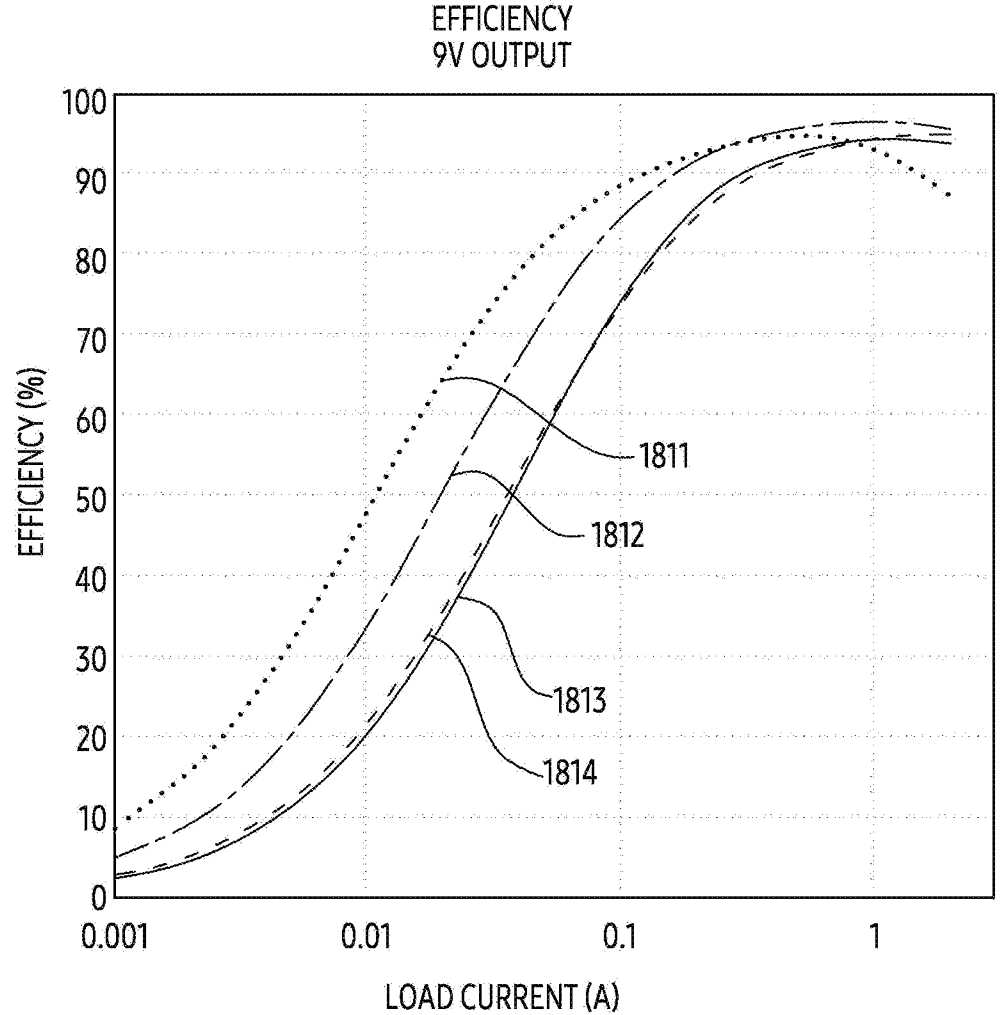
FIGS. 18A and 18B illustrate graphs illustrating power efficiency according to a current, according to various embodiments.
Figure 18B:
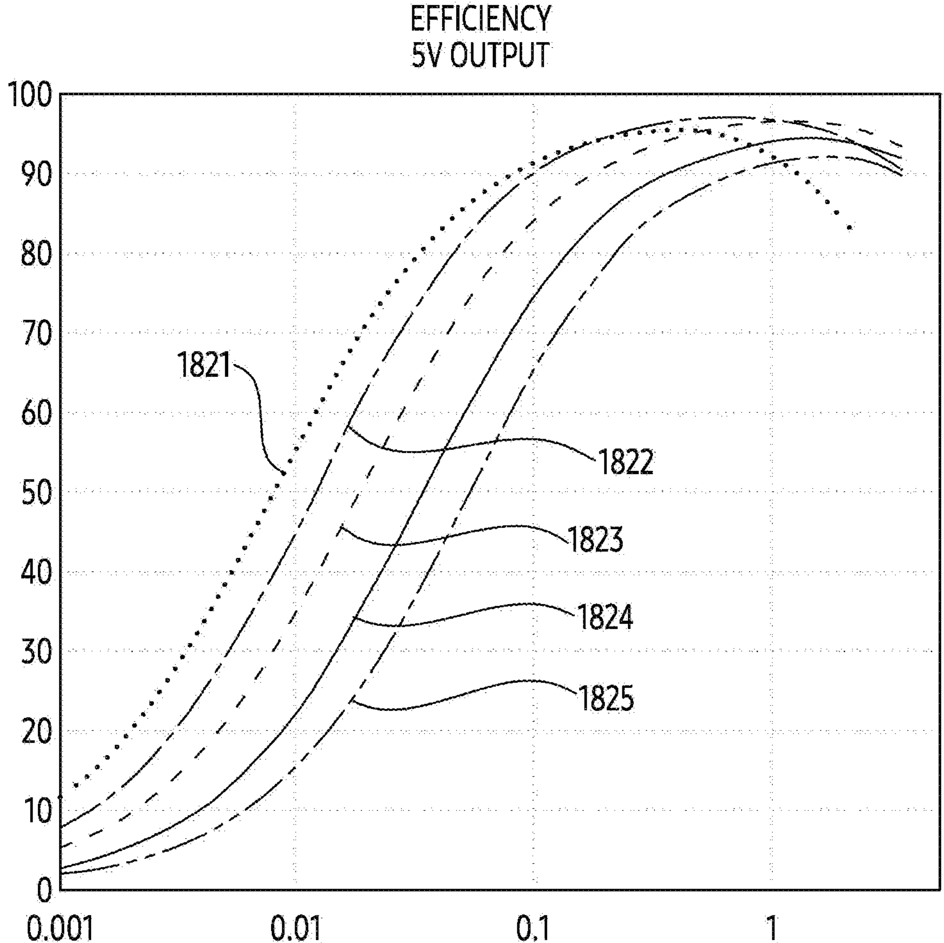

FIGS. 18A and 18B illustrate graphs illustrating power efficiency according to a current, according to various embodiments.

Referring to FIG. 18A, graphs 1811 to 1814 represent power efficiency according to current applied to a motor 540 in a state in which voltage applied to the motor 540 is set to 9V. For example, the graph 1811 represents the power efficiency according to the current applied to the motor 540, when voltage applied from a battery 550 to an integrated circuit (e.g., the first integrated circuit 561) is 4V. For example, the graph 1812 represents the power efficiency according to the current applied to the motor 540 when the voltage applied from the battery 550 to the integrated circuit (e.g., the first integrated circuit 561) is 7.6 V. For example, the graph 1813 represents the power efficiency according to the current applied to the motor 540 when the voltage applied from the battery 550 to the integrated circuit (e.g., the first integrated circuit 561) is 11.4 V. For example, the graph 1814 represents the power efficiency according to the current applied to the motor 540 when the voltage applied from the battery 550 to the integrated circuit (e.g., the first integrated circuit 561) is 16 V.

Referring to FIG. 18B, graphs 1821 to 1825 represent power efficiency according to current applied to the motor 540 in a state in which voltage applied to the motor 540 is set to 5V. For example, the graph 1821 represents the power efficiency according to the current applied to the motor 540 when the voltage applied from the battery 550 to the integrated circuit (e.g., the first integrated circuit 561) is 2.5V. For example, the graph 1822 represents the power efficiency according to the current applied to the motor 540 when the voltage applied from the battery 550 to the integrated circuit (e.g., the first integrated circuit 561) is 4V. For example, the graph 1823 represents the power efficiency according to the current applied to the motor 540 when the voltage applied from the battery 550 to the integrated circuit (e.g., the first integrated circuit 561) is 7.6 V. For example, the graph 1824 represents the power efficiency according to the current applied to the motor 540 when the voltage applied from the battery 550 to the integrated circuit (e.g., the first integrated circuit 561) is 11.4 V. For example, the graph 1825 represents the power efficiency according to the current applied to the motor 540 when the voltage applied from the battery 550 to the integrated circuit (e.g., the first integrated circuit 561) is 16 V.

Referring to FIGS. 18A and 18B, the processor 510 may identify that an operation mode of the electronic device 500 enters a low power mode from a normal mode. In the low power mode, the processor 510 may set the voltage provided from the battery 550 to be less than or equal to a pre-designated voltage value. For example, the processor 510 may change the operation mode of the electronic device 500 from the normal mode to the low power mode, based on identifying that the remaining amount of the battery 550 is less than or equal to a pre-designated remaining amount value.

For example, in a state that the voltage applied to the motor 540 is fixed at 9V, when the current is lowered to reduce thrust of the motor 540, the power efficiency may decrease. The processor 510 may operate the motor 540 with high efficiency even at a low current by applying a low voltage to the motor 540.

For another example, in case that the voltage applied from the battery 550 to the integrated circuit (e.g., the first integrated circuit 561) is 4V, efficiency when applying a voltage of 5V to the motor 540 may be higher than when applying a voltage of 9V to the motor 540. For example, 7.6V may be applied to the integrated circuit from the battery 550 in the normal mode. In the normal mode, the voltage applied to the motor 540 may be set to 9V. In the low power mode, 4V may be applied from the battery 550 to the integrated circuit. The processor 510 may identify that the operation mode of the electronic device 500 enters the low power mode from the normal mode. The processor 510 may increase the power efficiency by changing the voltage applied to the motor 540 through the integrated circuit from 9V to 5V, in the low power mode.

According to an embodiment, the processor 510 may identify that the voltage applied from the battery 550 to the integrated circuit has decreased when the voltage of the battery 550 is a low voltage. The processor 510 may reduce the voltage applied to the motor 540, based on identifying that the voltage applied to the integrated circuit from the battery 550 has decreased.

According to an embodiment, the processor 510 may set the motor 540 to operate with optimal power efficiency, based on the graphs 1811 to 1814 and the graphs 1821 to 1825. For example, when the voltage applied from the battery 550 to the integrated circuit is 4V, the processor 510 may identify the voltage applied to the motor 540 and/or the current applied to the motor 540 to maximize power efficiency. The processor 510 may reduce power consumption by applying the determined voltage and current to the motor 540.

Figure 19:
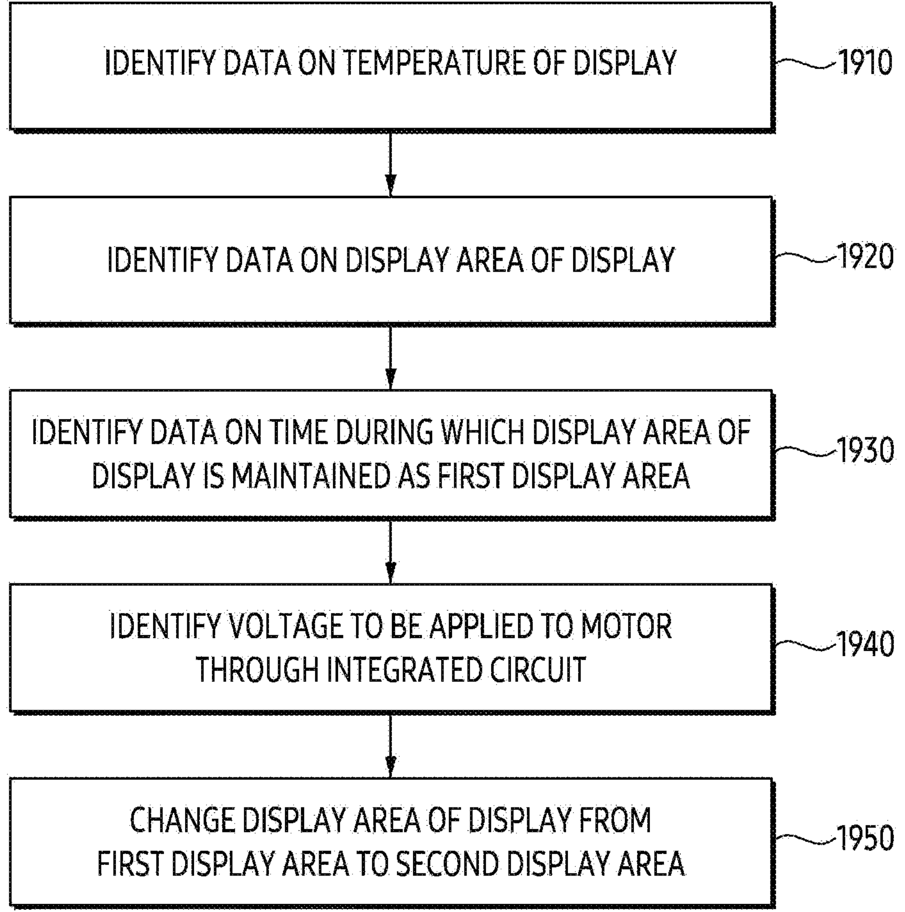
FIG. 19 is a flowchart illustrating an operation of an electronic device, according to various embodiments.

FIG. 19 is a flowchart illustrating an operation of an electronic device, according to various embodiments.

Referring to FIG. 19, in operation 1910, a processor 510 may identify data on a temperature of a display 520. For example, the processor 510 may identify data on the temperature of the display 520 through a sensor 530 (or at least one sensor), based on an input for changing the display area of the display 520 from a first display area to a second display area. Operation 1910 may correspond to operation 810 of FIG. 8.

In operation 1920, the processor 510 may identify data on the display area of the display 520. For example, the processor 510 may identify data on the display area of the display 520 through a sensor 530 (or at least one sensor) based on an input for changing the display area of the display 520 from the first display area to the second display area. Operation 1920 may correspond to operation 1110 of FIG. 11.

In operation 1930, the processor 510 may identify data on a time during which the display area of the display 520 is maintained (e.g., not rolled or unrolled) as the first display area. For example, the processor 510 may identify data on the time during which the display area of the display 520 is maintained as the first display area through the sensor 530 (or at least one sensor), based on an input for changing the display area of the display 520 from the first display area to the second display area. Operation 1930 may correspond to operation 1210 of FIG. 12.

In operation 1940, the processor 510 may identify (or determine) a voltage to be applied to the motor 540 through an integrated circuit. For example, the processor 510 may identify (or determine) a voltage to be applied to the motor 540 through an integrated circuit, based on at least one of data on a temperature of the display 520, data on the first display area, and data on the time during which the display area of the display 520 is maintained (i.e., has been maintained) as the first display area.

As an example, the processor 510 may identify (or determine) a voltage to be applied to the motor 540 through an integrated circuit, based on the data on the temperature of the display 520. As another example, the processor 510 may identify (or determine) a voltage to be applied to the motor 540 through an integrated circuit, based on the data on the first display area. As another example, the processor 510 may identify (or determine) a voltage to be applied to the motor 540 through an integrated circuit, based on the data on a time during which the display area of the display 520 is maintained as the first display area.

As an example, the processor 510 may identify (or determine) a voltage to be applied to the motor 540 through an integrated circuit, based on the data on the temperature of the display 520 and data on the first display area. As another example, the processor 510 may identify (or determine) a voltage to be applied to the motor 540 through an integrated circuit, based on the data on the temperature of the display 520 and the data on the time during which the display area of the display 520 is maintained as the first display area. As another example, the processor 510 may identify (or determine) a voltage to be applied to the motor 540 through an integrated circuit, based on the data on the first display area and the data on the time during which the display area of the display 520 is maintained as the first display area.

As an example, the processor 510 may identify (or determine) a voltage to be applied to the motor 540 through an integrated circuit, based on the data on the temperature of the display 520, the data on the first display area, and the data on the time when the display area of the display 520 is maintained as the first display area.

In operation 1950, the processor 510 may change the display area of the display 520 from the first display area to the second display area. For example, the processor 510 may change the display area of the display 520 from the first display area to the second display area by applying the determined voltage to the motor 540 through the integrated circuit. For example, the processor 510 may change the display area of the display 520 from the first display area to the second display area, by controlling the integrated circuit to apply the determined voltage to the motor 540. Operation 1950 may correspond to operation 830, operation 1130, or operation 1230 of FIG. 8 and FIG. 12.

According to an embodiment, at least one of operations 1910 to 1930 may be omitted. For example, the processor 510 may identify the data on the temperature of the display 520 and data on a display area of the display 520. The processor 510 may identify (or determine) the voltage to be applied to the motor 540 through the integrated circuit, based on the data on the temperature of the display 520 and the data on the display area of the display 520. The processor 510 may change the display area of the display 520 from the first display area to the second display area, by applying the determined voltage to the motor 540 through the integrated circuit.

Figure 20:
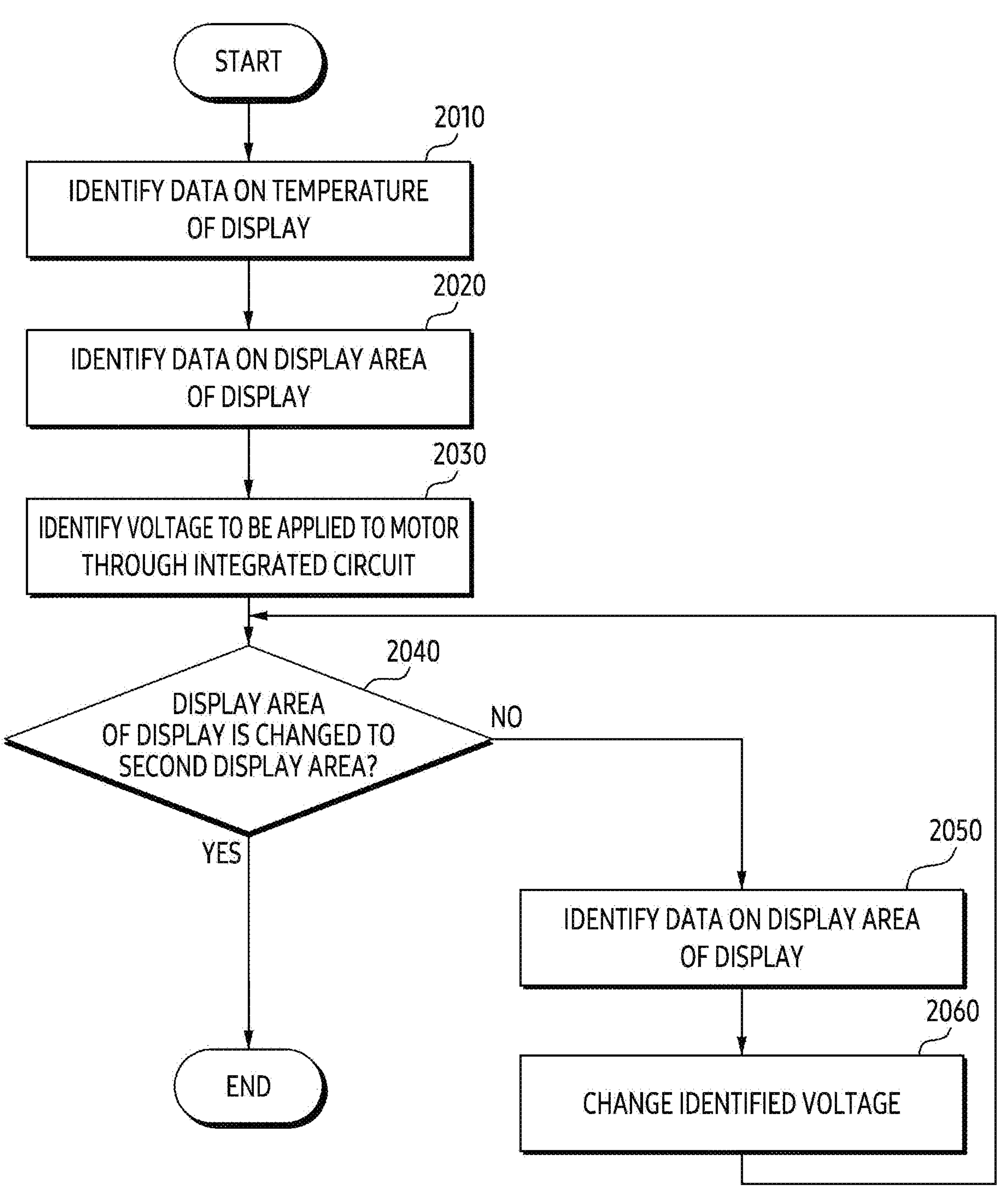
FIG. 20 is a flowchart illustrating an operation of an electronic device according to various embodiments.

FIG. 20 is a flowchart illustrating an operation of an electronic device according to various embodiments.

Referring to FIG. 20, in operation 2010, a processor 510 may identify data on a temperature of a display 520. For example, the processor 510 may identify data on the temperature of the display 520 through a sensor 530 (or at least one sensor), based on an input for changing a display area of the display 520 from a first display area to a second display area. Operation 2010 may correspond to operation 810 of FIG. 8.

In operation 2020, the processor 510 may identify data on the display area of the display 520. For example, the processor 510 may identify the data on the display area of the display 520 through the sensor 530 (or at least one sensor). Operation 2020 may correspond to operation 1110 of FIG. 11.

In operation 2030, the processor 510 may identify (or determine) a voltage to be applied to the motor 540 through an integrated circuit, based on the data on the temperature of the display 520 and the data on the display area of the display 520.

In operation 2040, the processor 510 may identify whether the display area of the display 520 is changed to the second display area. For example, the processor 510 may apply the determined voltage to the motor 540 to change the display area of the display 520 from the first display area to the second display area. The processor 510 may identify whether the display area of the display 520 is changed to the second display area after the determined voltage is applied to the motor 540. For example, the processor 510 may identify whether the display area of the display 520 is changed to the second display area, based on identifying a location of a second housing (or second support member 620) through the sliding sensor 532.

For example, the processor 510 may identify that the display area of the display 520 is changed to the second display area. The processor 510 may terminate an operation, based on identifying that the display area of the display 520 is changed to the second display area. As another example, the processor 510 may identify a time during which the display area of the display 520 is maintained as the second display area, based on identifying that the display area of the display 520 is changed (e.g., rolled or unrolled) to the second display area.

In operation 2050, the processor 510 may identify data on the display area of the display 520, based on identifying that the display area of the display 520 has not been changed to the second display area. For example, the processor 510 may identify that the display area of the display 520 is set to a third display area. The processor 510 may identify that a step-out has occurred based on identifying that the display area of the display 520 is set to the third display area distinct from the second display area.

In operation 2060, the processor 510 may change the determined voltage. The processor 510 may identify a step-out rate of the motor 540 based on the third display area. The processor 510 may change the voltage identified in operation 2030, based on the step-out rate of the motor 540. The processor 510 may change the determined voltage and apply the changed voltage to the motor 540, in order to change the third display area to the second display area. The processor 510 may perform operation 2040 after applying the changed voltage to the motor 540.

According to operations 2010 to 2060, the processor 510 may identify a voltage applied (or to be applied) to the motor 540, based on data on the temperature of the display 520 and data on the display area of the display 520. The processor 510 may apply the determined voltage to the motor 540, in order to change the display area of the display 520 from the first display area to the second display area. After applying the determined voltage, the processor 510 may identify that the display area of the display 520 is changed to the third display area instead of the second display area. The processor 510 may change the determined voltage, in order to change the display area of the display 520 from the third display area to the second display area. The processor 510 may change the display area of the display 520 from the third display area to the second display area by applying the changed voltage to the motor 540.

According to various embodiments, an electronic device (e.g., the electronic device 500 of FIG. 5A) may include a first housing (e.g., the first housing 210 of FIG. 2A), a second housing (e.g., the second housing 220 of FIG. 2A) slidably coupled to the first housing, a flexible display (e.g., the display 520 in FIG. 5A) disposed on a surface formed by the first housing and the second housing, which is insertable in the second housing or extractable from the second housing, a motor (e.g., the motor 540 of FIG. 5A) for inserting the flexible display in the second housing or extracting the flexible display from the second housing, an integrated circuit (e.g., the first integrated circuit 561 of FIG. 5C) for controlling voltage related to the motor, at least one sensor (e.g., the sensor 530 of FIG. 5A), and at least one processor (e.g., the processor 510 of FIG. 5A) operably coupled with the flexible display, the motor, the integrated circuit, and the at least one sensor. The at least one processor may be configured to identify (or obtain), through the at least one sensor, data of temperature related to the flexible display. The at least one processor may be configured to identify (or determine), based on the identified data of the temperature, voltage applied (or to be applied) to the motor through the integrated circuit. The at least one processor may be configured to change a display area of the flexible display by controlling the integrated circuit to apply (or to be applied) the determined voltage to the motor.

According to an embodiment, the electronic device may include a battery, and another integrated circuit (e.g., the second integrated circuit 562 of FIG. 5C) distinct from the integrated circuit. The at least one processor may be configured to change voltage provided from the battery to the identified (or determined) voltage through the integrated circuit. The at least one processor may be configured to apply the determined voltage to the other integrated circuit through the integrated circuit. The at least one processor may be configured to apply (or provide) the determined voltage to the motor through the other integrated circuit to which the determined voltage is applied from the integrated circuit.

According to an embodiment, the at least one processor may be set to identify (or determine) a velocity of the motor and a current applied to the motor based on the determined voltage. The at least one processor may be configured to control the motor through the other integrated circuit, based on the identified velocity and the identified current.

According to an embodiment, the first housing may include a support member located between one or more printed circuit boards (PCBs) and the flexible display. The at least one sensor may include a temperature sensor, and the temperature sensor is disposed to be surrounded by the support member in a case in which the temperature sensor is disposed on one of the one or more PCBs.

According to an embodiment, the temperature sensor may be disposed on one of the one or more PCBs toward the flexible display. The temperature sensor may be disposed to be spaced apart from at least one electronic component exceeding a reference heating range in a PCB on which the temperature sensor is disposed, among a plurality of electronic components disposed on the PCB.

According to an embodiment, an input for changing the display area of the flexible display may include an input for changing (or switching) the display area of the flexible display from a first display area to a second display area.

The at least one processor may be configured to identify (or obtain), through the at least one sensor, data of time during which the display area of the flexible display is maintained as the first display area. The at least one processor may be configured to identify (or determine), based on the data of the time during which the display area of the flexible display is maintained as the first display area, voltage to be applied to the motor.

According to an embodiment, the at least one processor may be configured to identify (or determine) the voltage to be applied to the motor, based on data on a temperature related to the flexible display and data on a time during which the display area of the flexible display is maintained (i.e., has been maintained) as the first display area.

According to an embodiment, the at least one sensor may include a plurality of hall sensors, and the plurality of hall sensors may be arranged along a direction in which the second housing slides (or parallel to a sliding direction). The second housing may include a magnetic material configured to move on the plurality of hall sensors as the display area of the flexible display is changed.

According to an embodiment, the at least one processor may be configured to identify, through the plurality of hall sensors (or using the plurality of hall sensors), data of magnetic power identified based on a location of the magnetic material. The at least one processor may be configured to identify (or obtain), based on the state data of the magnetic power, data of the display area of the flexible display.

According to an embodiment, the electronic device may include a rack gear coupled with the first housing, one or more printed circuit boards (PCBs), and a pinion gear coupled to the motor through a shaft. The battery may be disposed in at least part of the second housing, and the motor may be disposed on at least another part of the second housing and disposed apart from the battery.

According to an embodiment, the at least one processor may be configured to, in responses to receiving an input for changing the display area of the flexible display, change the display area of the flexible display by moving the rack gear based on rotating, using the motor, the pinion gear.

According to an embodiment, the display area of the flexible display may be set to be the smallest in a first state. The display area of the flexible display may be set to be the largest in a second state.

According to an embodiment, the at least one processor may be configured to change the display area of the flexible display from the first display area to the second display area by changing the flexible display from the first state to the second state. The at least one processor may be configured to change the determined voltage, based on identifying that the flexible display is in a third state distinct from the second state after the determined voltage is applied.

According to an embodiment, the at least one processor may be configured to apply, based on a plurality of pulses, the determined voltage to the motor, and change the display area of the flexible display by applying, based on the plurality of pulses, the determined voltage to the motor.

According to an embodiment, the at least one processor may be configured to change a velocity at which the display area of the flexible display changes, by changing an interval between the plurality of pulses.

According to an embodiment, the at least one processor may be configured to in a state in which a step-out of the motor is not occurred, identify the number of pulses for changing a state of the flexible display from a first state to a second state as a first number. The at least one processor may be configured to apply, based on the first number of pulses, pre-designated voltage to the motor for changing the display area of the flexible display in a state in which the step-out of the motor occurs. The at least one processor may be configured to, after applying, based on the first number of pulses, the pre-designated voltage to the motor, identify the state of the flexible display as a third state distinct from the second state. The at least one processor may be configured to identify a corresponding number of pluses for changing the state of the flexible display from the first state to the third state if the step-out of the motor does not occur, as a second number. The at least one processor may be configured to identify, based on the first number and the second number, a step-out rate of the motor.

According to an embodiment, the at least one processor may be configured to identify (or determine), based on the step-out rate of the motor and the pre-designated voltage, voltage to be applied to the motor.

According to an embodiment, the at least one processor may be configured to identify, based on the step-out rate of the motor, presence of a foreign material between the flexible display and the second housing. The at least one processor may be configured to, based on identifying the presence of the foreign material between the flexible display and the second housing, provide alarm through the flexible display.

According to an embodiment, the at least one sensor may include a drop detection sensor and an impact detection sensor. The at least one processor may be configured to identify that an impact caused by the drop has occurred on the electronic device, through the drop detection sensor and the impact detection sensor. The at least one processor may be configured to identify a step-out rate of the motor, based on identifying that the impact caused by the drop has occurred on the electronic device. The at least one processor may be configured to change the voltage applied to the motor to change the display area of the flexible display, based on the step-out rate of the motor.

According to an embodiment, the at least one processor may be configured to identify that an operation mode of the electronic device enters a low power mode from a normal mode. The at least one processor may be configured to change the voltage applied to the motor through the integrated circuit, based on identifying that the electronic device enters the low power mode from the normal mode.

According to an embodiment, the at least one processor may be configured to identify (or determine) the voltage to be applied to the motor as a first voltage, in a state in which the operation mode of the electronic device is the normal mode. The at least one processor may be configured to identify (or determine) the voltage to be applied to the motor as a second voltage, in a state in which the operation mode of the electronic device is the low power mode. The first voltage may be set greater than the second voltage.

According to an embodiment, the at least one processor may be configured to identify (or determine) voltage to be applied to the motor as a first voltage value when the temperature related to the flexible display is a first temperature. The at least one processor may be configured to identify (or determine) the voltage to be applied to the motor as a second voltage value when the temperature related to the flexible display is a second temperature lower than the first temperature. The second voltage value may be greater than the first voltage.

According to various embodiments, an electronic device may include a first housing, a second housing slidably coupled to the first housing, a flexible display disposed on a surface formed by the first housing and the second housing, which is insertable in the second housing or extractable from the second housing, a motor for inserting the flexible display in the second housing or extracting the flexible display from the second housing, an integrated circuit for controlling voltage related to the motor, at least one sensor, and at least one processor operably coupled with the flexible display, the motor, the integrated circuit, and the at least one sensor. The at least one processor may be configured to identify data on a display area of the flexible display through the at least one sensor. The at least one processor may be configured to identify (or determine) voltage to be applied to the motor through the integrated circuit, based on the data on the display area of the flexible display. The at least one processor may be configured to change the display area of the flexible display by controlling the integrated circuit to apply the determined voltage to the motor.

According to an embodiment, the electronic device may include a rack gear coupled with the first housing, one or more printed circuit boards (PCBs), a pinion gear coupled to the motor through a shaft, and a battery disposed in at least a part of the second housing. The motor may be disposed on at least another part of the second housing and disposed apart from the battery.

According to an embodiment, the at least one processor may be configured to identify a size of the display area, based on data on the display area of the flexible display. The at least one processor may be configured to identify (or determine) voltage to be applied to the motor as a first voltage value, in a first state in which the size of the display area is a first size. The at least one processor may be configured to identify (or determine) the voltage to be applied to the motor as a second voltage value in a second state in which the size of the display area is a second size greater than the first size. The second voltage value may be set to be greater than the first voltage value.

According to various embodiments, an electronic device may include a first housing, a second housing slidably coupled to the first housing, a flexible display disposed on a surface formed by the first housing and the second housing, which is insertable in the second housing or extractable from the second housing, a motor for inserting the flexible display in the second housing or extracting the flexible display from the second housing, an integrated circuit for controlling voltage related to the motor, at least one sensor, and at least one processor operably coupled with the flexible display, the motor, the integrated circuit, and the at least one sensor. The at least one processor may be configured to identify, based on an input for changing the display area of the flexible display from a first display area to a second display area, data of time during which the display area of the flexible display is maintained as the first display area through the at least one sensor. The at least one processor may be configured to identify (or determine) voltage to be applied to the motor through the integrated circuit, based on data of the time during which the display area of the flexible display is maintained as the first display area. The at least one processor may be configured to change the display area of the flexible display from the first display area to the second display area, by applying the determined voltage to the motor through the integrated circuit.

According to an embodiment, the at least one processor may be configured to identify data on the first display area of the flexible display through the at least one sensor, based on an input for changing the display area of the flexible display from the first display area to the second display area. The at least one processor may be configured to identify (or determine) the voltage to be applied to the motor through the integrated circuit, based on data on the first display area and data on a time during which the display area of the flexible display is maintained (i.e., has been maintained) as the first display area.

According to an embodiment, the at least one processor may be configured to identify data on a temperature related to the flexible display, through the at least one sensor, based on an input for changing the display area of the flexible display from the first display area to the second display area. The at least one processor may be configured to identify (or determine) the voltage to be applied to the motor through the integrated circuit, based on data on the temperature related to the flexible display and data on a time during which the display area of the flexible display is maintained as the first display area.

According to an embodiment, the at least one processor may be configured to identify data on the temperature related to the flexible display through the at least one sensor, based on an input for changing the display area of the flexible display from the first display area to the second display area. The at least one processor may be configured to identify (or determine) the voltage to be applied to the motor through the integrated circuit, based on data on the temperature of the flexible display, data on the first display area, and data on the time during which the display area of the flexible display is maintained as the first display area.

According to an embodiment, the electronic device may include a rack gear coupled to the first housing, one or more printed circuit boards (PCBs) disposed in the first housing, a pinion gear coupled to the motor through a shaft, and a battery disposed in at least a part of the second housing. The motor may be disposed on at least another part of the second housing and disposed apart from the battery.

According to various embodiments, an electronic device may include: a first housing; a second housing slidably coupled to the first housing; a flexible display disposed on a surface formed by the first housing and the second housing, which is insertable in the second housing or extractable from the second housing; a motor for inserting the flexible display in the second housing or extracting the flexible display from the second housing; an integrated circuit for controlling voltage related to the motor; at least one sensor; and at least one processor operably coupled with the flexible display, the motor, the integrated circuit, and the at least one sensor. The at least one processor may be configured to identify, through the at least one sensor, whether a size of a display area of the flexible display is maintained, increases or decreases, determine voltage to be applied to the motor based on whether the size of the display area of the flexible display is maintained, increases or decreases, and change the display area of the flexible display by controlling the integrated circuit to apply the determined voltage to the motor.

According to an embodiment, the at least one processor may be configured to determine the voltage to be applied to the motor in a case that the size of the display area is maintained for a pre-designated time duration greater than the voltage to be applied to the motor in a case that the size of the display area increases or decreases.

According to an embodiment, the at least one processor is configured to determine the voltage to be applied to the motor in a case that the size of the display area decreases greater than the voltage to be applied to the motor in a case that the size of the display area increases.

According to various embodiments, an electronic device may include a first housing, a second housing slidably coupled to the first housing, a flexible display disposed on a surface formed by the first housing and the second housing, which is insertable in the second housing or extractable from the second housing, a motor for inserting the flexible display in the second housing or extracting the flexible display from the second housing, an integrated circuit for controlling voltage related to the motor, at least one sensor, and at least one processor operably coupled with the flexible display, the motor, the integrated circuit, and the at least one sensor. The at least one processor may be configured to, in a state in which a step-out of the motor does not occur, change a display area of the flexible display by applying, based on a plurality of pulses, pre-designated voltage to the motor and identify a total number of pulses for changing a state of the flexible display from a first state to a second state as a first number. The at least one processor may be configured to apply, based on a pre-designated number of pulses, pre-designated voltage to the motor for changing the display area of the flexible display, after applying, based on the pre-designated number of pulses, the pre-designated voltage to the motor, identify whether the state of the flexible display is different from a pre-designated state of the flexible display reached after applying, based on the pre-designated number of pulses, the pre-designated voltage to the motor when a step-out of the motor does not occur, identify a step-out rate of the motor when the state of the flexible display is different from the pre-designated state, determine, based on the step-out rate of the motor and the pre-designated voltage, voltage to be applied to the motor, and change the display area of the flexible display by controlling the integrated circuit to apply the determined voltage to the motor.

According to an embodiment, the at least one sensor may include a drop detection sensor and an impact detection sensor, and the at least one processor may be configured to: identify that an impact caused by drop of the electronic device occurs on the electronic device, through the drop detection sensor and the impact detection sensor, and apply, based on the pre-designated number of pulses, the pre-designated voltage to the motor for changing the display area of the flexible display in a case that the impact is identified.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” or “connected with” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means".

What is claimed is:

1. An electronic device comprising:
a first housing;
a second housing slidably coupled to the first housing;
a flexible display disposed on a surface formed by the first housing and the second housing, which is insertable in the second housing or extractable from the second housing;
a motor configured to insert the flexible display in the second housing or extracting the flexible display from the second housing;
a first integrated circuit configured to control voltage related to the motor;
at least one sensor; and
at least one processor operably coupled with the flexible display, the motor, the first integrated circuit, and the at least one sensor, wherein the at least one processor is configured to:
identify, through the at least one sensor, data of temperature related to the flexible display,
determine, based on the identified data of the temperature, voltage to be applied to the motor through the first integrated circuit, and
change a display area of the flexible display by controlling the first integrated circuit to apply the determined voltage to the motor.

2. The electronic device of claim 1, wherein the electronic device further comprises:
a battery; and
a second integrated circuit distinct from the first integrated circuit,
wherein the at least one processor is further configured to:
change, through the first integrated circuit, voltage provided from the battery to the determined voltage,
apply, through the first integrated circuit, the determined voltage to the second integrated circuit, and
apply, through the second integrated circuit to which the determined voltage is applied from the first integrated circuit, the determined voltage to the motor.

3. The electronic device of claim 1, wherein the first housing further comprises a support member located between one or more printed circuit boards (PCBs), and the flexible display,
wherein the at least one sensor comprises a temperature sensor, and
wherein the temperature sensor is disposed to be surrounded by the support member in a case in which the temperature sensor is disposed on one of the one or more PCBs.

4. The electronic device of claim 1, wherein an input for changing the display area of the flexible display comprises an input for changing the display area of the flexible display from a first display area to a second display area.

5. The electronic device of claim 4, wherein the at least one processor is further configured to:
identify, through the at least one sensor, data of time during which the display area of the flexible display is maintained as the first display area, and
determine, based on the data of the time during which the display area of the flexible display is maintained as the first display area, voltage to be applied to the motor.

6. The electronic device of claim 1, wherein the at least one sensor comprises a plurality of hall sensors,
wherein the plurality of hall sensors are arranged along a direction in which the second housing slides, and
wherein the second housing comprises a magnetic material configured to move on the plurality of hall sensors as the display area of the flexible display is changed.

7. The electronic device of claim 6, wherein the at least one processor is further configured to:
identify, through the plurality of hall sensors, data of magnetic power identified based on a location of the magnetic material, and
identify, based on the data of the magnetic power, state data of the display area of the flexible display.

8. The electronic device of claim 2, wherein the electronic device further comprises:
a rack gear coupled with the first housing;
one or more PCBs; and
a pinion gear coupled to the motor through a shaft,
wherein the battery is disposed in at least part of the second housing, and
wherein the motor is disposed on at least another part of the second housing and disposed apart from the battery.

9. The electronic device of claim 8, wherein the at least one processor is configured to, in responses to receiving an input for changing the display area of the flexible display, change the display area of the flexible display by moving the rack gear based on rotating the pinion gear using the motor.

10. The electronic device of claim 1, wherein the at least one processor is configured to:
apply, based on a plurality of pulses, the determined voltage to the motor, and
change the display area of the flexible display by applying, based on the plurality of pulses, the determined voltage to the motor.

11. The electronic device of claim 10, wherein the at least one processor is configured to change a velocity at which the display area of the flexible display changes, by changing an interval between the plurality of pulses.

12. The electronic device of claim 10, wherein the at least one processor is configured to:
in a state in which a step-out of the motor does not occur, identify a total number of pulses for changing a state of the flexible display from a first state to a second state as a first number,
apply, based on the first number of pulses, pre-designated voltage to the motor for changing the display area of the flexible display in a state in which the step-out of the motor occurs,
after applying, based on the first number of pulses, the pre-designated voltage to the motor, identify the state of the flexible display as a third state distinct from the second state,
identify a corresponding number of pluses for changing the state of the flexible display from the first state to the third state if the step-out of the motor does not occur, as a second number, and
identify, based on the first number and the second number, a step-out rate of the motor.

13. The electronic device of claim 12, wherein the at least one processor is configured to determine, based on the step-out rate of the motor and the pre-designated voltage, voltage to be applied to the motor.

14. The electronic device of claim 13, wherein the at least one processor is configured to:

identify, based on the step-out rate of the motor, presence of a foreign material between the flexible display and the second housing, and based on identifying the presence of the foreign material between the flexible display and the second housing, provide alarm through the flexible display.

15. The electronic device of claim 1, wherein the at least one processor is configured to:

determine the voltage to be applied to the motor as a first voltage value when the temperature related to the flexible display is a first temperature, and determine the voltage to be applied to the motor as a second voltage value when the temperature related to the flexible display is a second temperature lower than the first temperature, and wherein the second voltage value is greater than the first voltage.

16. An electronic device comprising:

a first housing;

a second housing slidably coupled to the first housing;

a flexible display disposed on a surface formed by the first housing and the second housing, which is insertable in the second housing or extractable from the second housing;

a motor configured to insert the flexible display in the second housing or extracting the flexible display from the second housing;

an integrated circuit configured to control voltage related to the motor;

at least one sensor; and at least one processor operably coupled with the flexible display, the motor, the integrated circuit, and the at least one sensor, wherein the at least one processor is configured to:

identify, through the at least one sensor, data of temperature related to the flexible display, identify, through the at least one sensor, whether a size of a display area of the flexible display is maintained, increases or decreases, determine voltage to be applied to the motor based on whether the size of the display area of the flexible display is maintained, increases or decreases, and the data of temperature related to the flexible display, and change the display area of the flexible display by controlling the integrated circuit to apply the determined voltage to the motor.

17. The electronic device of claim 16, wherein the at least one processor is configured to determine the voltage to be applied to the motor in a case that the size of the display area is maintained for a pre-designated time duration greater than the voltage to be applied to the motor in a case that the size of the display area increases or decreases.

18. The electronic device of claim 16, wherein the at least one processor is configured to determine the voltage to be applied to the motor in a case that the size of the display area decreases greater than the voltage to be applied to the motor in a case that the size of the display area increases.

19. An electronic device comprising:

a first housing;

a second housing slidably coupled to the first housing;

a flexible display disposed on a surface formed by the first housing and the second housing, which is insertable in the second housing or extractable from the second housing;

a motor configured to insert the flexible display in the second housing or extracting the flexible display from the second housing;

an integrated circuit configured to control voltage related to the motor;

at least one sensor; and at least one processor operably coupled with the flexible display, the motor, the integrated circuit, and the at least one sensor, wherein the at least one processor is configured to:

apply, based on a pre-designated number of pulses, pre-designated voltage to the motor for changing the display area of the flexible display, after applying, based on the pre-designated number of pulses, the pre-designated voltage to the motor, identify whether the state of the flexible display is different from a pre-designated state of the flexible display reached after applying, based on the pre-designated number of pulses, the pre-designated voltage to the motor when a step-out of the motor does not occur, identify a step-out rate of the motor when the state of the flexible display is different from the pre-designated state, identify, through the at least one sensor, data of temperature related to the flexible display, determine, based on the step-out rate of the motor, the pre-designated voltage, and the data of temperature related to the flexible display, voltage to be applied to the motor, and change the display area of the flexible display by controlling the integrated circuit to apply the determined voltage to the motor.

20. The electronic device of claim 19, wherein the at least one sensor includes a drop detection sensor and an impact detection sensor, wherein the at least one processor is configured to:

identify that an impact caused by drop of the electronic device occurs on the electronic device, through the drop detection sensor and the impact detection sensor, and apply, based on the pre-designated number of pulses, the pre-designated voltage to the motor for changing the display area of the flexible display in a case that the impact is identified.

* * * * *